(12) United States Patent
Izawa et al.

(10) Patent No.: US 12,468,096 B2
(45) Date of Patent: Nov. 11, 2025

(54) OPTICAL DEVICE AND METHOD FOR MANUFACTURING OPTICAL DEVICE

(71) Applicant: FURUKAWA ELECTRIC CO., LTD., Tokyo (JP)

(72) Inventors: Atsushi Izawa, Tokyo (JP); Jun Miyokawa, Tokyo (JP); Maiko Ariga, Tokyo (JP); Kazuya Nagashima, Tokyo (JP); Yozo Ishikawa, Tokyo (JP); Taketsugu Sawamura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 31 days.

(21) Appl. No.: 17/808,007

(22) Filed: Jun. 21, 2022

(65) Prior Publication Data
US 2022/0317392 A1     Oct. 6, 2022

Related U.S. Application Data

(63) Continuation of application No. PCT/JP2020/049017, filed on Dec. 25, 2020.

(30) Foreign Application Priority Data

Dec. 25, 2019  (JP) ................... 2019-235084

(51) Int. Cl.
*H04B 10/00* (2013.01)
*G02B 6/028* (2006.01)
*G02B 6/42* (2006.01)

(52) U.S. Cl.
CPC .......... *G02B 6/4204* (2013.01); *G02B 6/028* (2013.01); *G02B 6/4213* (2013.01); *G02B 6/4238* (2013.01); *G02B 6/4243* (2013.01)

(58) Field of Classification Search
CPC .... G02B 6/4238; G02B 6/028; G02B 6/4213; G02B 6/4243; G02B 6/46; G02B 6/4228; G02B 6/4251; G02B 6/4204
See application file for complete search history.

(56) References Cited

U.S. PATENT DOCUMENTS 4,708,429 A * 11/1987 Clark ................... G02B 6/4248
                                                  385/94
5,305,413 A *  4/1994 Payne .................. G02B 6/3812
                                                  385/128
(Continued)

FOREIGN PATENT DOCUMENTS

| CN | 1106985 A | 8/1995 |
|---|---|---|
| CN | 1487320 A | 4/2004 |

(Continued)

OTHER PUBLICATIONS

Combined Chinese Office Action and Search Report issued on Jul. 30, 2023 in Chinese Patent Application No. 202080088970.5 (with English translation of Office Action), 38 pages.

(Continued)

*Primary Examiner* — Agustin Bello
(74) *Attorney, Agent, or Firm* — Oblon, McClelland, Maier & Neustadt, L.L.P.

(57) ABSTRACT

An optical device includes: a case; a sleeve attached to the case, the sleeve including a first through-hole penetrating between an inside and an outside of the case, and an inclined surface inclined with respect to a penetrating direction of the first through-hole, the inclined surface having an opening of the first through-hole; a first optical fiber including a core wire including a core and a clad, and a sheath configured to surround the core wire, wherein an exposed portion of the core wire not surrounded by the sheath passes through the first through-hole; and a first joining material interposed and sealed between an outer peripheral surface of the exposed (Continued)

portion and an inner peripheral surface of the first through-hole in the first through-hole.

17 Claims, 13 Drawing Sheets

(56) References Cited

U.S. PATENT DOCUMENTS

| | | | | |
|---|---|---|---|---|
| 5,548,677 A | | 8/1996 | Kakii et al. | |
| 5,588,086 A | * | 12/1996 | Fan | G02B 6/3825 385/139 |
| 6,004,046 A | * | 12/1999 | Sawada | G02B 6/4214 385/92 |
| 6,088,504 A | * | 7/2000 | Filas | G02B 6/4248 385/95 |
| 6,292,615 B1 | * | 9/2001 | Merritt | G02B 6/4248 385/138 |
| 6,310,997 B1 | * | 10/2001 | Kato | G02B 6/02209 385/38 |
| 6,746,160 B2 | * | 6/2004 | Takeuti | C03C 25/66 385/80 |
| 6,796,724 B2 | * | 9/2004 | Goldman | G02B 6/4212 385/91 |
| 6,920,276 B2 | * | 7/2005 | Sakurai | G02B 6/3855 385/39 |
| 6,953,286 B2 | * | 10/2005 | Jeong | G02B 6/4248 385/78 |
| 7,296,938 B1 | * | 11/2007 | Shapson | G02B 6/4204 385/94 |
| 7,621,673 B2 | * | 11/2009 | Takeuchi | G02B 6/3636 385/60 |
| 9,696,505 B2 | * | 7/2017 | Camarda | G02B 6/4248 |
| 2002/0025123 A1 | * | 2/2002 | Fujimura | G02B 6/4245 385/88 |
| 2002/0051617 A1 | * | 5/2002 | Khan | G02B 6/4248 385/137 |
| 2003/0138204 A1 | * | 7/2003 | Zhou | G02B 6/2938 385/27 |
| 2004/0037536 A1 | * | 2/2004 | Sakurai | G02B 6/3855 385/128 |
| 2004/0042734 A1 | * | 3/2004 | Jeong | G02B 6/3887 385/78 |
| 2005/0013555 A1 | * | 1/2005 | Nishie | G02B 6/423 385/88 |
| 2005/0018974 A1 | * | 1/2005 | Rolston | G02B 6/4214 385/83 |
| 2005/0074219 A1 | * | 4/2005 | Dela Rosa | G02B 6/4428 385/137 |
| 2007/0172175 A1 | * | 7/2007 | Imanbayev | G02B 6/3861 385/86 |
| 2008/0044135 A1 | * | 2/2008 | Furuichi | G02B 6/4292 385/34 |
| 2012/0213475 A1 | | 8/2012 | Selli et al. | |
| 2012/0321250 A1 | * | 12/2012 | Yamaji | G02B 6/4214 385/38 |
| 2014/0286363 A1 | * | 9/2014 | Kasai | H01S 5/02251 228/101 |
| 2015/0370022 A1 | | 12/2015 | Selli et al. | |
| 2016/0266335 A1 | * | 9/2016 | Durrant | G02B 6/4251 |
| 2017/0357073 A1 | * | 12/2017 | Burek | G02B 6/475 |
| 2019/0212506 A1 | * | 7/2019 | Fujimura | G02B 6/4239 |
| 2019/0219774 A1 | | 7/2019 | Tamekuni et al. | |
| 2022/0317392 A1 | * | 10/2022 | Izawa | G02B 6/4228 |

FOREIGN PATENT DOCUMENTS

| | | |
|---|---|---|
| CN | 102834754 A | 12/2012 |
| CN | 102859410 A | 1/2013 |
| CN | 109642990 A | 4/2019 |
| CN | 110018543 A | 7/2019 |
| JP | 61-29186 A | 2/1986 |
| JP | 8-338930 A | 12/1996 |
| JP | 2001-13358 A | 1/2001 |
| JP | 2002-23005 A | 1/2002 |
| JP | 2002-64212 A | 2/2002 |
| JP | 2002-122751 A | 4/2002 |
| JP | 2003-255148 A | 9/2003 |
| JP | 2004-85834 A | 3/2004 |
| JP | 2004-93978 A | 3/2004 |
| JP | 2011-222880 A | 11/2011 |
| JP | 2019-120881 A | 7/2019 |
| JP | 2019-159220 A | 9/2019 |

OTHER PUBLICATIONS

International Search Report issued Mar. 16, 2021 in PCT/JP2020/049017, filed on Dec. 25, 2020, 3 pages.
Japanese Notice of Reasons for Refusal issued Sep. 24, 2024 in Japanese Patent Application No. 2021-567738 with English Machine translation, 8 pgs.

* cited by examiner

OPTICAL DEVICE AND METHOD FOR MANUFACTURING OPTICAL DEVICE

This application is a continuation of International Application No. PCT/JP2020/049017, filed on Dec. 25, 2020 which claims the benefit of priority of the prior Japanese Patent Application No. 2019-235084, filed on Dec. 25, 2019, the entire contents of which are incorporated herein by reference.

BACKGROUND

The present disclosure relates to an optical device and a method for manufacturing the optical device.

In the related art, there is known an optical device in which an optical fiber and a case are joined to each other by a joining material such as solder in a portion where the optical fiber penetrates the case (for example, JP 2003-255148 A).

SUMMARY

In the known optical device with a configuration in which a through-hole opens on a surface orthogonal to the direction in which an optical fiber extends, depending on specifications of the through-hole and a joining material, the joining material having fluidity may be difficult to enter the through-hole from the opening.

There is a need for an optical device in which a joining material having fluidity more easily enters a through-hole through which an optical fiber passes and a method for manufacturing the optical device.

According to one aspect of the present disclosure, there is provided an optical device including: a case; a sleeve attached to the case, the sleeve including a first through-hole penetrating between an inside and an outside of the case, and an inclined surface inclined with respect to a penetrating direction of the first through-hole, the inclined surface having an opening of the first through-hole; a first optical fiber including a core wire including a core and a clad, and a sheath configured to surround the core wire, wherein an exposed portion of the core wire not surrounded by the sheath passes through the first through-hole; and a first joining material interposed and sealed between an outer peripheral surface of the exposed portion and an inner peripheral surface of the first through-hole in the first through-hole.

DETAILED DESCRIPTION

Figure 1:
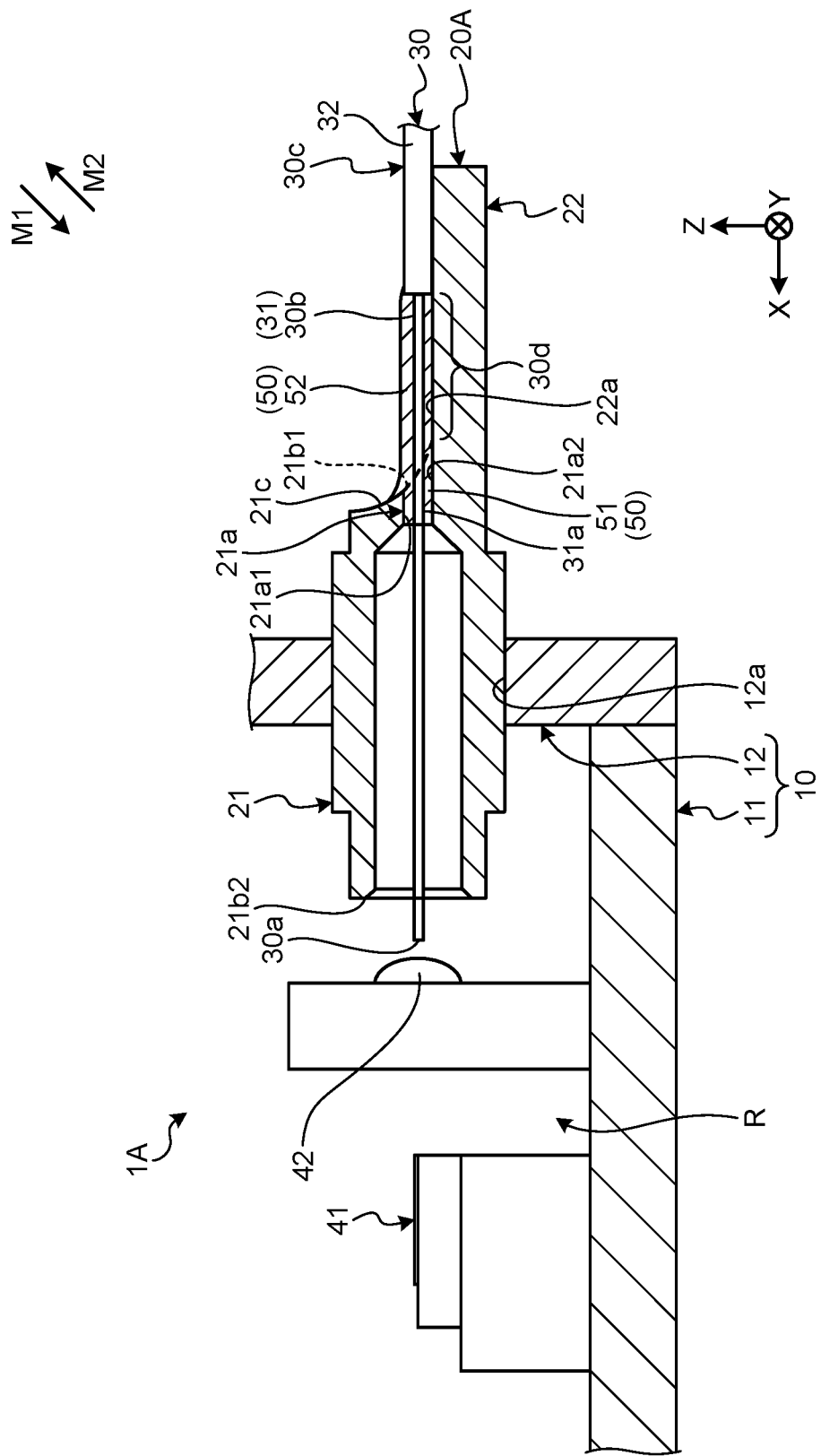
FIG. 1 is an exemplary schematic cross-sectional view (partial side view) of an optical device of a first embodiment.

Hereinafter, exemplary embodiments and modifications are disclosed. Configurations of the embodiments and the modifications described below, and functions and results (effects) provided by the configurations are examples. The present disclosure may be realized by configurations other than those disclosed in the following embodiments and modifications. In addition, according to the present disclosure, it is possible to obtain at least one of various effects (including derivative effects) obtained by the configuration.

Embodiments and modifications described below have similar configurations. Therefore, according to the configurations of the respective embodiments and modifications, similar functions and effects based on the similar configurations may be obtained. In addition, in the following description, similar reference numerals are given to similar configurations, and redundant description may be omitted.

In the present specification, ordinal numbers are given for convenience in order to distinguish components, parts, and the like, and do not indicate priority or order.

In each drawing, an X direction is represented by an arrow X, a Y direction is represented by an arrow Y, and a Z direction is represented by an arrow Z. The X direction, the Y direction, and the Z direction intersect each other and are orthogonal to each other.

First Embodiment

FIG. 1 is a cross-sectional view (partial side view) of an optical device 1A of a first embodiment in a cross section orthogonal to the Y direction. The optical device 1A includes a case 10, a sleeve 20A, an optical fiber 30, a light source unit 41, and a lens 42.

The optical fiber 30 is attached to the case 10 in a state of penetrating the sleeve 20A. An end portion 30a of the optical fiber 30 is located in the case 10. The light source unit 41 and lens 42 are accommodated in case 10. Light emitted from the light source unit 41 is input to the end portion 30a of the optical fiber 30 via the lens 42. That is, the light source unit 41 outputs light input to the optical fiber 30. The optical fiber 30 is an example of a first optical fiber, and the light source unit 41 is an example of an optical device. The end portion 30a may also be referred to as an input unit.

The case 10 includes a bottom wall 11, a side wall 12, and a top wall (not illustrated) as walls. The case 10 has, for example, a rectangular parallelepiped shape and a box shape.

The bottom wall 11 may be made of a material having high thermal conductivity, such as copper tungsten (CuW), copper molybdenum (CuMo), or aluminum oxide ($Al_2O_3$). In addition, the side wall 12 and the top wall may be made of a material having a low thermal expansion coefficient, such as an Fe—Ni—Co alloy or aluminum oxide ($Al_2O_3$).

The case 10 is hermetically sealed, whereby air and water are prevented from acting on optical components such as the light source unit 41, the lens 42, and the optical fiber 30 accommodated in the case 10. For example, the optical device 1A is configured such that an inert gas such as nitrogen gas filling the case 10 at the time of manufacturing does not leak to the outside of the case 10.

The bottom wall 11 extends while crossing the Z direction. In the present embodiment, the bottom wall 11 extends in the X direction and the Y direction and is orthogonal to the Z direction. In an accommodation chamber R of the case 10, the light source unit 41 and the lens 42 are attached on the bottom wall 11. The bottom wall 11 may also be referred to as a support portion or a base.

The side wall 12 illustrated in FIG. 1 extends while crossing the X direction. In the present embodiment, the side wall 12 extends in the Y direction and the Z direction and is orthogonal to the X direction. Although not illustrated in FIG. 1, the case 10 also has a side wall 12 that extends while crossing the Y direction (see FIGS. 14 and 15). In the present embodiment, the side wall 12 extending while crossing the Y direction extends in the X direction and the Z direction and is orthogonal to the Y direction.

The side wall 12 is provided with an opening 12a. The opening 12a is, for example, a through-hole, but an open end thereof may be, for example, a notch covered with the top wall, the bottom wall 11, another member (not illustrated), or the like.

The sleeve 20A is attached to the side wall 12 in a state of covering or closing the opening 12a. In the present embodiment, as an example, the sleeve 20A penetrates the opening 12a in the X direction and closes the opening 12a. The opening 12a is a circular hole, and a portion penetrating the opening 12a of the sleeve 20A has a cylindrical outer peripheral surface.

A gap between an outer peripheral surface of the sleeve 20A and a peripheral edge of the opening 12a is sealed. The sleeve 20A is joined to the side wall 12 in such a manner that a gap may be sealed, for example, by soldering, brazing, or welding.

Furthermore, the sleeve 20A may be made of a material having a low thermal expansion coefficient, such as an Fe—Ni—Co alloy or aluminum oxide ($Al_2O_3$).

Figure 2:
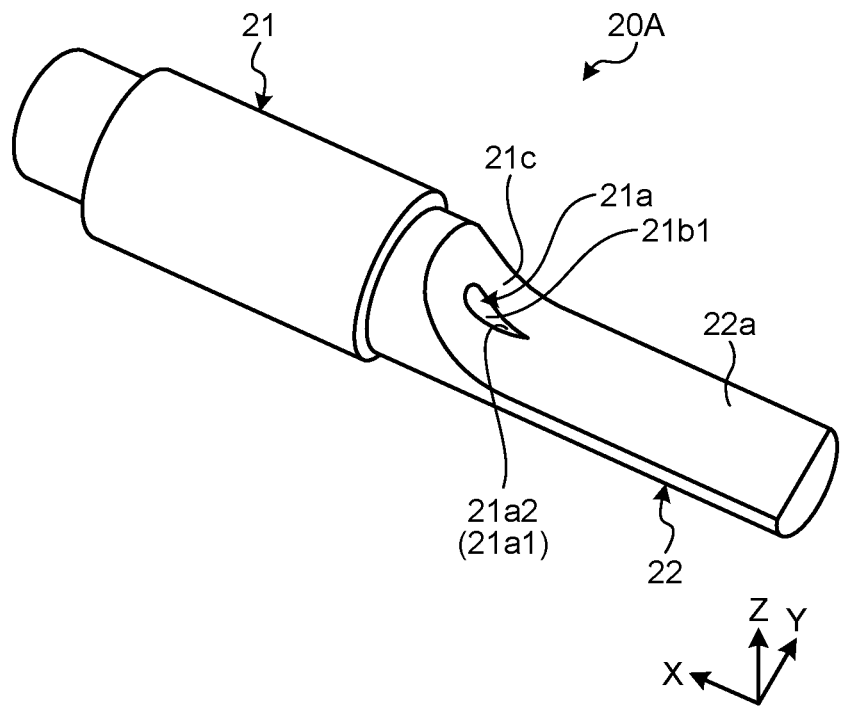
FIG. 2 is an exemplary schematic perspective view of a sleeve of the first embodiment.

FIG. 2 is a perspective view of the sleeve 20A. As illustrated in FIGS. 1 and 2, the sleeve 20A includes a cylindrical portion 21 and a semi-cylindrical portion 22. Outer peripheral surfaces of the cylindrical portion 21 and the semi-cylindrical portion 22 are concentric cylindrical surfaces and extend in the X direction. The semi-cylindrical portion 22 is adjacent to the cylindrical portion 21 in a direction opposite to the X direction. In other words, the semi-cylindrical portion 22 protrudes in the direction opposite to the X direction from end portions of the cylindrical portion 21 in the direction opposite to the X direction and a direction opposite to the Z direction. The cylindrical portion 21 may also be referred to as a body or a sleeve base, and the semi-cylindrical portion 22 may also be referred to as a protruding portion.

The semi-cylindrical portion 22 has a top surface 22a intersecting the Z direction. The top surface 22a is, for example, a flat surface facing the Z direction, extends in the X direction and the Y direction, and is orthogonal to the Z direction.

An end surface 21c of the cylindrical portion 21 in a direction opposite to the X direction is inclined with respect to the X direction and the Z direction. In other words, the end surface 21c is not orthogonal to and parallel to the X direction and the Z direction. Further, in the present embodiment, as an example, the end surface 21c is a concave curved surface having a cylindrical inner surface shape with a generatrix along the Y direction, and is recessed in an M1 direction between the X direction and a direction opposite to the Z direction. In addition, the top surface 22a and the end surface 21c are smoothly connected to each other without a step. The end surface 21c is an example of an inclined surface.

The cylindrical portion 21 is provided with a through-hole 21a extending in the X direction. As illustrated in FIG. 1, the optical fiber 30 penetrates the through-hole 21a in the X direction.

An open end 21b2 of the through-hole 21a in the X direction is located in the case 10. Meanwhile, the through-hole 21a is opened to the end surface 21c at an open end 21b1 in the direction opposite to the X direction. The end surface 21c is exposed to the outside of the case 10. That is, the open end 21b1 is located outside the case 10. That is, the through-hole 21a penetrates between the inside and the outside of the case 10. The through-hole 21a is an example of a first through-hole, and the X direction is an example of the penetrating direction In addition, the top surface 22a of the semi-cylindrical portion 22 and a bottom portion 21a2, which is an end portion of the through-hole 21a in the direction opposite to the Z direction, are smoothly continued without a step along the X direction.

The optical fiber 30 includes a core wire 31 and a sheath 32 surrounding the core wire 31. The core wire 31 includes a core (not illustrated) and a clad (not illustrated) surrounding the core. The optical fiber 30 is an example of a first optical fiber.

The core wire 31 may be made of, for example, glass. The sheath 32 may be made of, for example, a synthetic resin material. The sheath 32 may be partially formed of a coating having high heat resistance.

At the end portion 30a of the optical fiber 30 in the X direction and the vicinity thereof, the sheath 32 is removed, and the core wire 31 is exposed. The optical fiber 30 includes an exposed portion 30b which is not surrounded by the sheath 32 and from which the core wire 31 is exposed, and a covered portion 30c in which the core wire 31 is surrounded by the sheath 32.

The exposed portion 30b penetrates the through-hole 21a of the cylindrical portion 21. In the through-hole 21a, a joining material 50 is interposed between an outer peripheral surface 31a of the core wire 31 (exposed portion 30b) and an inner peripheral surface 21a1 of the through-hole 21a. The joining material 50 joins the outer peripheral surface 31a and the inner peripheral surface 21a1, and eventually joins the sleeve 20A and the optical fiber 30. The joining material 50 is, for example, solder, for example, solder containing zinc. A portion of the joining material 50 located in the through-hole 21a is an example of a first joining material 51. In the optical fiber 30, the exposed portion 30b may be provided at least at a position penetrating the through-hole 21a.

In the through-hole 21a, the joining material 50 seals a gap between the outer peripheral surface 31a and the inner peripheral surface 21a1 to prevent passage of gas and liquid in the gap. That is, a joining material 50 prevents leakage of a filling gas to the outside of case 10 through the gap from the inside of case 10, and entry of air and liquid into case 10 through the gap from the outside of case 10.

Further, the joining material 50 extends in the direction opposite to the X direction from the open end 21b1 and is also located on the top surface 22a. On the top surface 22a, the joining material 50 joins the outer peripheral surface 31a and the top surface 22a in a state of surrounding the periphery of the core wire 31 (optical fiber 30), and eventually joins the sleeve 20A and the optical fiber 30. A portion of the joining material 50 located on the top surface 22a is an example of a second joining material 52.

On the top surface 22a, the exposed portion 30b is supported by the semi-cylindrical portion 22 via the joining material 50. In the present embodiment, the covered portion 30c is also supported by the semi-cylindrical portion 22. The semi-cylindrical portion 22 is an example of a support portion. A portion of the optical fiber 30 located outside the through-hole 21a is an example of an outer portion 30d.

In the present embodiment, as an example, the portion (first joining material 51) of the joining material 50 located in the through-hole 21a and the portion (second joining material 52) located on the top surface 22a are integrated with each other, but they may be adjacent to each other or may be separated from each other in the X direction in a state of not being integrated.

Figure 3:
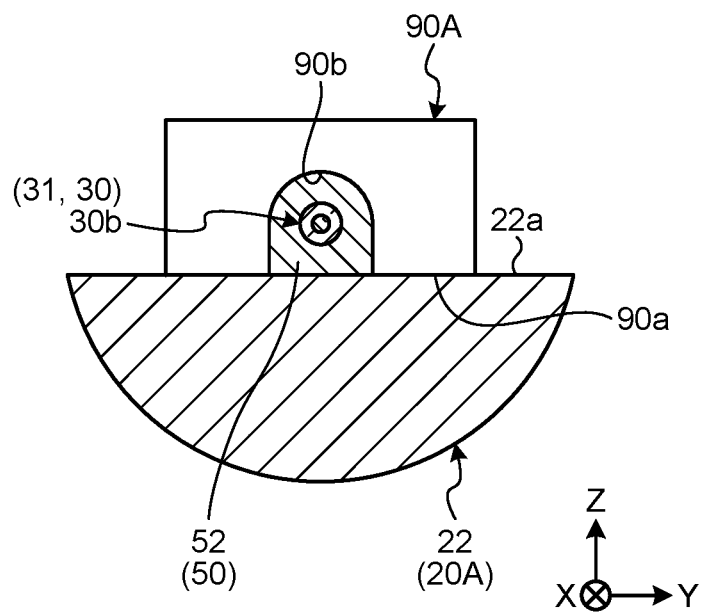
FIG. 3 is an exemplary schematic cross-sectional view illustrating a state in which an optical fiber is soldered onto a sleeve by an ultrasonic soldering apparatus in a method for manufacturing an optical device according to the first embodiment.

FIG. 3 is a cross-sectional view in a cross section orthogonal to the X direction illustrating a state in which the exposed portion 30b is soldered on the top surface 22a by soldering iron 90A of an ultrasonic soldering apparatus. The soldering iron 90A may heat a contacted solder (joining material 50). The solder is heated by the soldering iron 90A to have fluidity. In addition, the soldering iron 90A may apply ultrasonic vibration to the solder in contact or an object to be joined.

A robot or an operator places the solder (joining material 50) on the top surface 22a in a state where the solder has fluidity, and causes the solder to enter the gap between the outer peripheral surface 31a and the inner peripheral surface 21a1 (first step). In this first step, the robot or the operator moves the solder and the soldering iron 90A in the M1 direction or in the direction opposite to the Z direction in FIGS. 1 and 3 to move the solder and the soldering iron close to the sleeve 20A and in the X direction in a state of being close to or in contact with the top surface 22a. The solder is heated by the soldering iron 90A to have fluidity. The solder having fluidity is placed on the top surface 22a. In addition, the solder having fluidity enters the through-hole 21a from the open end 21b1 by surface tension of the solder, adhesion force between the outer peripheral surface 31a and the inner peripheral surface 21a1, gravity, pressing force from the soldering iron 90A, or the like, and fills a gap between the outer peripheral surface 31a and the inner peripheral surface 21a1.

Here, as illustrated in FIG. 1, the through-hole 21a opens to the end surface 21c. As described above, the end surface 21c is inclined with respect to the X direction. Therefore, in the present embodiment, the opening area of the through-hole 21a at the open end 21b1 is larger than that in a configuration in which the through-hole 21a extending in the X direction is opened to a surface orthogonal to the X direction. Therefore, the solder (joining material 50) having fluidity more easily enters the through-hole 21a from the open end 21b1. In the present embodiment, the portion of the end surface 21c where the open end 21b1 is provided faces the M2 direction between the direction opposite to the X direction and the Z direction. Therefore, the solder flowing in the M1 direction or the Z direction, which is the direction opposite to the M2 direction, due to pressing by the soldering iron 90A or the weight of the solder is likely to enter the through-hole 21a.

As illustrated in FIG. 3, the soldering iron 90A has, for example, a planar end surface 90a, and the soldering iron 90A is provided with a groove 90b opened in the end surface 90a. The end surface 90a and the groove 90b are formed in a shape in which the solder (second joining material 52, joining material 50) having fluidity surrounds the exposed portion 30b separated from the top surface 22a in the Z direction and may be interposed between the top surface 22a and the concave surface of the groove 90b in a state in which the end surface 90a is in contact with the top surface 22a. With such a configuration, in the first step, the soldering iron 90A is heated while being ultrasonically vibrated, so that heat and ultrasonic vibration (vibration) are transmitted from the end surface 90a to the top surface 22a, that is, the sleeve 20A. Therefore, heat and ultrasonic vibration are directly transmitted from the soldering iron 90A to the solder, and heat and ultrasonic vibration are indirectly transmitted through the sleeve 20A.

After the first step, the solder (joining material 50) is solidified by being cooled by natural cooling or forced cooling (second step). In the second step, the gap between the outer peripheral surface 31a and the inner peripheral surface 21a1 in the through-hole 21a is filled with the joining material 50 and sealed, and the sleeve 20A and the optical fiber 30 are joined to each other via the joining material 50.

As described above, in the optical device 1A of the present embodiment, the sleeve 20A attached to the case 10 is provided with the through-hole 21a (first through-hole) penetrating between the inside and the outside of the case 10. The sleeve 20A has an end surface 21c (inclined surface) which is inclined with respect to the penetrating direction (X direction) of the through-hole 21a and to which the through-hole 21a is open. The optical fiber 30 (first optical fiber) includes a core wire 31 including a core and a clad, and a sheath 32 surrounding the core wire 31. The exposed portion 30b of the core wire 31 not surrounded by the sheath 32 passes through the through-hole 21a. The joining material 50 (first joining material 51) is interposed and sealed between the outer peripheral surface 31a of the exposed portion 30b and the inner peripheral surface 21a1 of the through-hole 21a in the through-hole 21a.

According to such a configuration, since the through-hole 21a extending in the X direction is opened to the end surface 21c inclined with respect to the X direction, the joining material 50 having fluidity easily enters the through-hole 21a from the open end 21b1. Therefore, according to such a configuration, the joining material 50 having fluidity enters the through-hole 21a more reliably, for example, and the outer peripheral surface 31a and the inner peripheral surface 21a1, and thus the sleeve 20A and the optical fiber 30 may be joined more reliably. In addition, the joining material 50 may more reliably seal, for example, the gap between the outer peripheral surface 31a and the inner peripheral surface 21a1.

In the present embodiment, the sleeve 20A includes a semi-cylindrical portion 22 (support portion) that supports the optical fiber 30.

According to such a configuration, for example, the optical fiber 30 may be more stably supported by the semi-cylindrical portion 22. In addition, for example, in the configuration in which the sleeve 20A and the optical fiber 30 are joined to each other by the second joining material 52, the posture of the optical fiber 30 with respect to the sleeve 20A may be further stabilized in the first step.

In the present embodiment, the joining material 50 (second joining material 52) joins the semi-cylindrical portion 22 and the outer portion 30d of the optical fiber 30 located outside the through-hole 21a.

According to such a configuration, for example, the sleeve 20A and the optical fiber 30 may be more firmly joined to each other. In addition, this makes it difficult for the end portion 30a of the optical fiber 30 to vibrate, and an advantage that optical coupling between the optical fiber 30 and an optical device such as the light source unit 41 is further stabilized, in other words, vibration resistance characteristics of the optical coupling are improved is also obtained.

In the present embodiment, the joining material 50 (first joining material 51) in the through-hole 21a and the joining material 50 (second joining material 52) outside the through-hole 21a are adjacent to or integrated with each other.

According to such a configuration, for example, since the first joining material 51 and the second joining material 52 may be formed by a continuous work process, labor and cost for manufacturing the optical device 1A may be further reduced.

In the present embodiment, the first joining material 51 is, for example, solder.

The configuration of the present embodiment may be applied to the optical device 1A in which the sleeve 20A and the optical fiber 30 are soldered in the through-hole 21a.

In the present embodiment, the first joining material 51 and the second joining material 52 are, for example, solder.

According to such a configuration, for example, since the first joining material 51 and the second joining material 52 may be formed by a continuous work process, labor and cost for manufacturing the optical device 1A may be further reduced.

In the present embodiment, the semi-cylindrical portion 22 is provided outside the case 10.

According to such a configuration, for example, as compared with a case where the semi-cylindrical portion 22 is provided in the case 10, it is possible to obtain an advantage that a degree of freedom of layout of components in the case 10 increases.

In the present embodiment, the optical device 1A includes the light source unit 41 (optical device) accommodated in the case 10.

The configuration of the present embodiment may be applied to the optical device 1A in which the light source unit 41 is accommodated in the case 10.

The method for manufacturing the optical device 1A according to the present embodiment includes the first step of allowing the joining material 50 in a flowing state to enter between the outer peripheral surface 31a and the inner peripheral surface 21a1 of the through-hole 21a opened to the inclined end surface 21c, and the second step of solidifying the joining material 50.

According to such a method, for example, in the first step, since the joining material 50 having fluidity easily enters the gap between the outer peripheral surface 31a and the inner peripheral surface 21a1 from the open end 21b1 of the end surface 21c inclined with respect to the X direction, the joining material 50 more reliably enters the through-hole 21a, and the sleeve 20A and the optical fiber 30 may be joined to each other more reliably. In addition, the joining material 50 may more reliably seal the gap between the outer peripheral surface 31a and the inner peripheral surface 21a1. In addition, it is also possible to obtain an advantage that labor and cost for manufacturing the optical device 1A may be further reduced.

In the present embodiment, in the first step, a soldering iron 90A (ultrasonic soldering apparatus) is used.

According to such a method, for example, since an oxide film on a material surface is removed by ultrasonic waves, a stronger joining state between the sleeve 20A and the optical fiber 30 may be obtained. In addition, since a better or stronger joining state is easily obtained by using the ultrasonic soldering apparatus, for example, flux is not required in the first step and pretreatment such as metal coating is not required for the exposed portion 30b which is the joining target.

In the present embodiment, vibration is transmitted from the soldering iron 90A to the sleeve 20A in the first step.

According to such a method, for example, ultrasonic vibration may be transmitted from the soldering iron 90A to the solder (joining material 50 having fluidity) via the sleeve 20A, and thus, the effect by ultrasonic soldering is more easily enhanced.

First Modification

Figure 4:
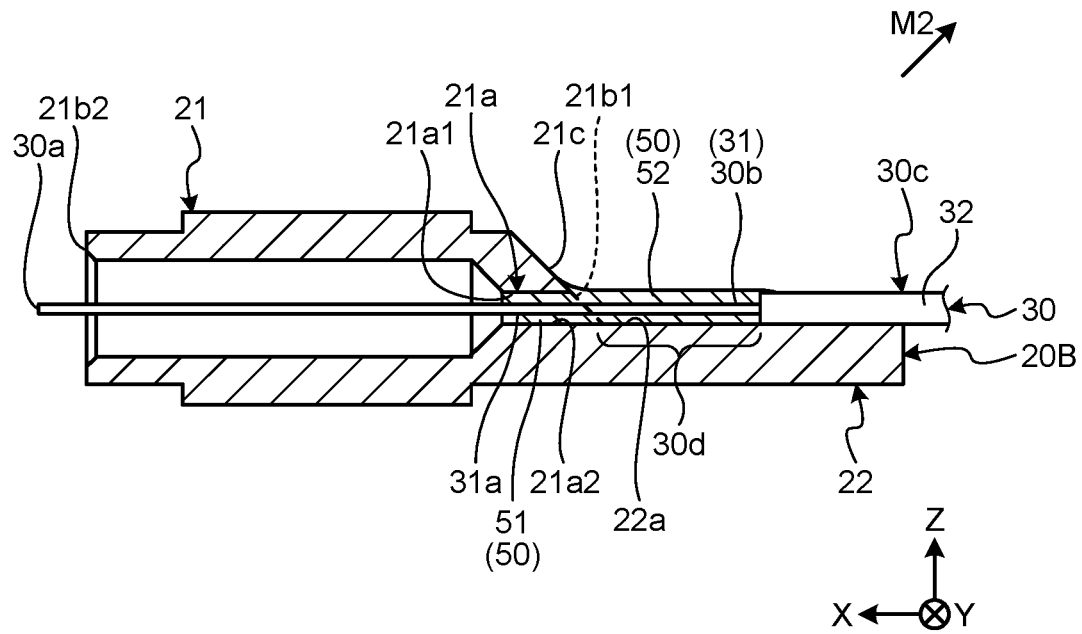
FIG. 4 is a cross-sectional view (partial side view) of a sleeve and an optical fiber of a first modification.

FIG. 4 is a cross-sectional view (partial side view) of a sleeve 20B and an optical fiber 30 of a first modification as a modification of the first embodiment in a cross section orthogonal to the Y direction. As illustrated in FIG. 4, in the present modification, an end surface 21c of the sleeve 20B is a flat surface inclined with respect to the X direction and the Z direction. The end surface 21c faces the M2 direction between the direction opposite to the X direction and the Z direction. The sleeve 20B of the present modification may be incorporated in the optical device 1A of the first embodiment instead of the sleeve 20A.

Even with such a configuration, since the through-hole 21a is opened to the end surface 21c inclined with respect to the X direction, the joining material 50 (first joining material 51) having fluidity easily enters the gap between the outer peripheral surface 31a and the inner peripheral surface 21a1 from the open end 21b1 of the end surface 21c inclined with respect to the X direction. Therefore, the joining material 50 more reliably enters the through-hole 21a, the sleeve 20B and the optical fiber 30 may be more reliably joined, and the gap between the outer peripheral surface 31a and the inner peripheral surface 21a1 may be more reliably sealed.

In the present modification, the end surface 21c (inclined surface) inclined with respect to the X direction extends to the side opposite to the outer portion 30d with respect to the open end 21b1.

According to such a configuration, for example, in the first step, interference between the solder or the soldering iron 90A and the end surface 21c on the side opposite to the outer portion 30d with respect to the open end 21b1 is suppressed. Therefore, according to such a configuration, it is possible to more smoothly execute the first step, and eventually, it is possible to obtain an advantage that it is possible to further reduce the labor and cost for manufacturing the optical device 1A.

Second Embodiment

Figure 5:
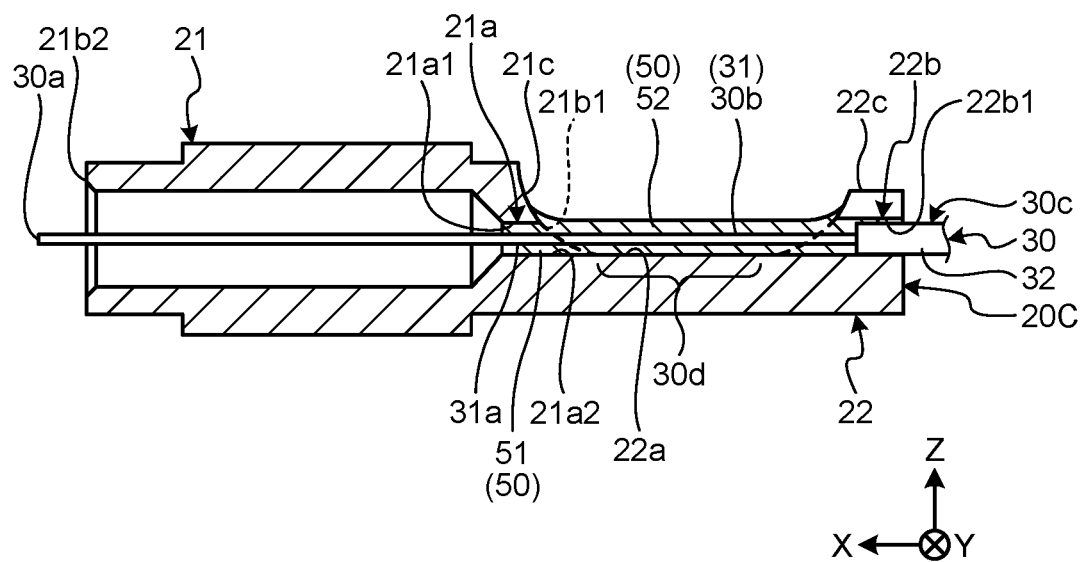
FIG. 5 is a cross-sectional view (partial side view) of a sleeve and an optical fiber according to a second embodiment.
Figure 6:
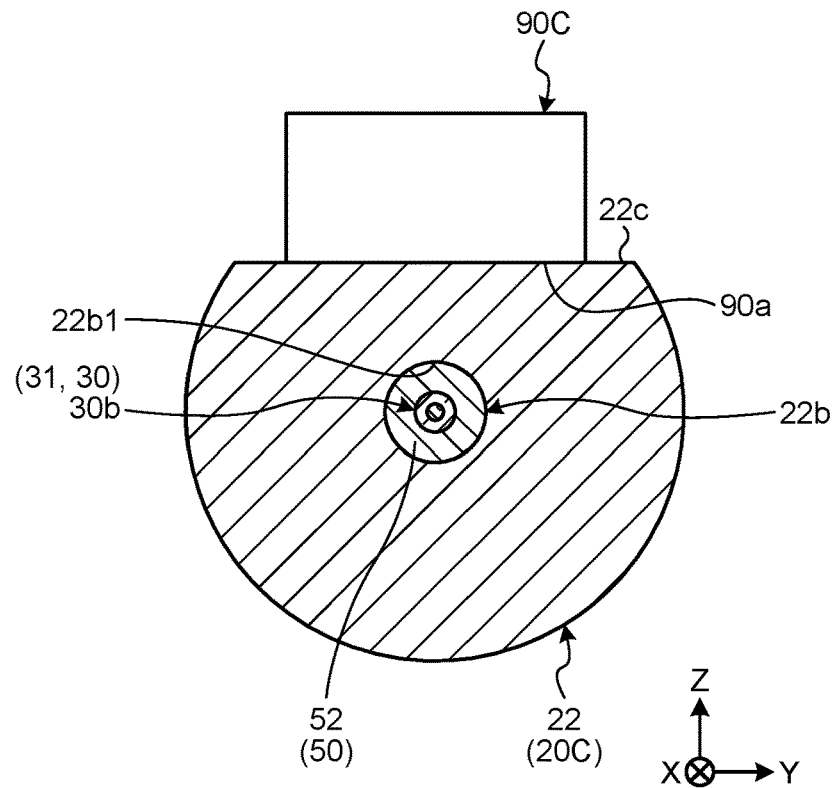
FIG. 6 is an exemplary schematic cross-sectional view illustrating a state in which an optical fiber is soldered onto a sleeve by an ultrasonic soldering apparatus in a method for manufacturing an optical device according to the second embodiment.

FIG. 5 is a cross-sectional view (partial side view) of a sleeve 20C and an optical fiber 30 of a second embodiment in a cross section orthogonal to the Y direction. FIG. 6 is a cross-sectional view in a cross section orthogonal to the X direction illustrating a state in which the sleeve 20C and the optical fiber 30 are soldered by a soldering iron 90C of an ultrasonic soldering apparatus. The sleeve 20C of the present embodiment may be incorporated in the optical device 1A of the first embodiment instead of the sleeve 20A.

As illustrated in FIG. 5, in the present embodiment, a through-hole 22b through which the optical fiber 30 passes is provided in a semi-cylindrical portion 22 in addition to a through-hole 21a provided in a cylindrical portion 21. The through-hole 22b is separated from the through-hole 21a. A top surface 22a is positioned between the through-hole 22b and the through-hole 21a. The through-hole 22b is concentric with the through-hole 21a and extends in the X direction. In the present embodiment, as an example, a boundary portion between an exposed portion 30b and a covered portion 30c is accommodated in the through-hole 22b. In other words, a part of the exposed portion 30b and a part of the covered portion 30c are accommodated in the through-hole 22b. The through-hole 22b is an example of a second through-hole.

A joining material 50 (second joining material 52) is located in the through-hole 22b, and joins the outer peripheral surface 31a of the exposed portion 30b (core wire 31) and an inner peripheral surface 22b1 of the through-hole 22b to each other in the through-hole 22b.

A top surface 22c is provided at an end portion in the Z direction of a portion of the semi-cylindrical portion 22 where the through-hole 22b is provided. The top surface 22c has a planar shape facing the Z direction. As illustrated in FIG. 6, the soldering iron 90C of the ultrasonic soldering device has, for example, a planar end surface 90a. In the first step, by heating the soldering iron 90C while ultrasonically vibrating the soldering iron 90C in a state where the end surface 90a is in contact with the top surface 22c, heat and ultrasonic vibration are indirectly transmitted from the soldering iron 90C to the joining material 50 in the through-hole 22b via the semi-cylindrical portion 22.

As described above, in the present embodiment, the semi-cylindrical portion 22 (support portion) is provided with the through-hole 22b (second through-hole) through which the optical fiber 30 (first optical fiber) passes.

According to such a configuration, for example, the sleeve 20C may more reliably support the optical fiber 30. In addition, the optical fiber 30 may be positioned by the through-hole 22b. Further, by joining the outer peripheral surface 31a and the inner peripheral surface 22b1 with the joining material 50, for example, the sleeve 20C and the optical fiber 30 may be more firmly joined.

Third Embodiment

Figure 7:
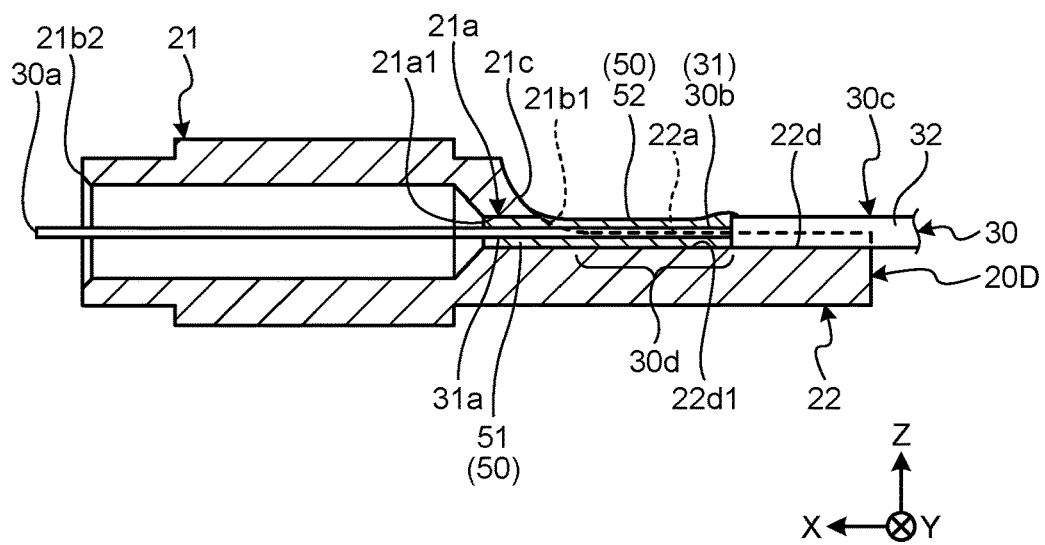
FIG. 7 is a cross-sectional view (partial side view) of a sleeve and an optical fiber according to a third embodiment.
Figure 8:
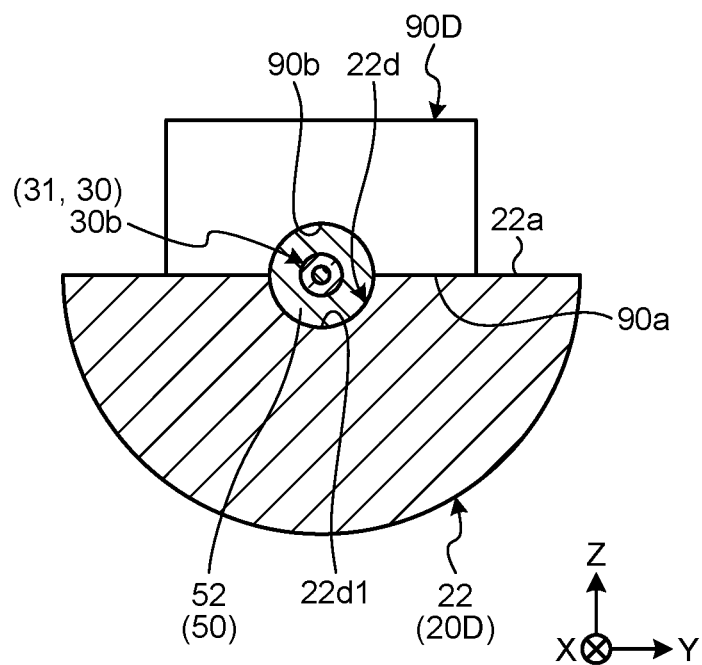
FIG. 8 is an exemplary schematic cross-sectional view illustrating a state in which an optical fiber is soldered onto a sleeve by an ultrasonic soldering apparatus in a method for manufacturing an optical device according to the third embodiment.

FIG. 7 is a cross-sectional view (partial side view) of a sleeve 20D and an optical fiber 30 of a third embodiment in a cross section orthogonal to the Y direction. FIG. 8 is a cross-sectional view in a cross section orthogonal to the X direction illustrating a state in which a sleeve 20D and the optical fiber 30 are soldered by a soldering iron 90D of an ultrasonic soldering apparatus. The sleeve 20D of the present embodiment may be incorporated in the optical device 1A of the first embodiment instead of the sleeve 20A.

As illustrated in FIGS. 7 and 8, in the present embodiment, a semi-cylindrical portion 22 is provided with a groove 22d for accommodating the optical fiber 30. The groove 22d is provided on a top surface 22a, is recessed in the direction opposite to the Z direction, and extends in the X direction. The groove 22d is smoothly connected to a through-hole 21a provided in a cylindrical portion 21 in the direction opposite to the X direction. That is, a recessed surface 22d1 of the groove 22d and a semi-cylindrical surface on the side opposite to the Z direction of an inner peripheral surface 21a1 of the through-hole 21a are smoothly connected without a step. In the present embodiment, the optical fiber 30 is accommodated in the groove 22d by about half, but the present disclosure is not limited thereto, and at least a part of the optical fiber 30 may be accommodated in the groove 22d.

As illustrated in FIG. 8, the soldering iron 90D has, for example, a planar end surface 90a, and the soldering iron 90D is provided with a groove 90b opened to the end surface 90a. The end surface 90a and the groove 90b are formed in a shape in which the joining material 50 (second joining material 52) having fluidity may be interposed between a concave surface of the groove 22d and a concave surface of the groove 90b in a state in which the end surface 90a is in contact with the top surface 22a. With such a configuration, in the first step, the soldering iron 90D is heated while being ultrasonically vibrated, and thus, heat and ultrasonic vibration are transmitted from the end surface 90a to the top surface 22a, that is, the sleeve 20D. As a result, heat and ultrasonic vibration are directly transmitted from the soldering iron 90D to the joining material 50, and heat and ultrasonic vibration are indirectly transmitted via the sleeve 20D.

As described above, in the present embodiment, the semi-cylindrical portion 22 (support portion) is provided with the groove 22d at least partially accommodating the optical fiber 30.

According to such a configuration, for example, it is possible to obtain an advantage that the optical fiber 30 may be easily positioned at a predetermined position by the groove 22d. In addition, for example, in the configuration in which the sleeve 20D and the optical fiber 30 are joined to each other by the joining material 50 in the groove 22d, since the joining material 50 may be held in the groove 22d, the volume of the joining material 50 surrounding the optical fiber 30 may be further reduced as compared with the case of spreading on the top surface 22a.

Second Modification

Figure 9:
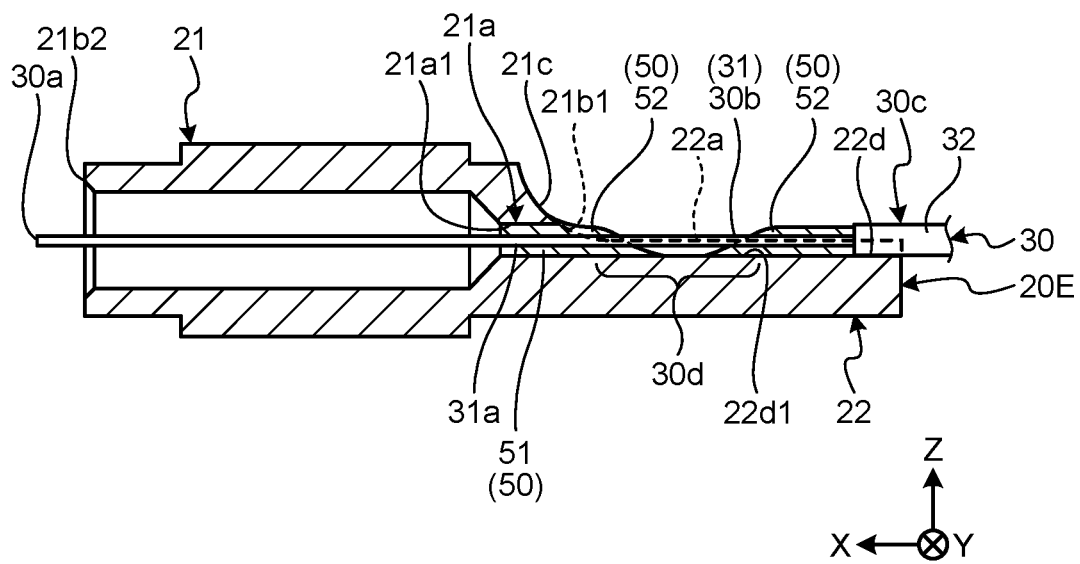
FIG. 9 is a cross-sectional view (partial side view) of a sleeve and an optical fiber of a second modification.

FIG. 9 is a cross-sectional view (partial side view) of a sleeve 20E and an optical fiber 30 of a second modification as a modification of the third embodiment in a cross section orthogonal to the Y direction. As illustrated in FIG. 9, in the present modification, the joining material 50 (second joining material 52) is separated into a plurality of places. That is, the joining material 50 includes the first joining material 51 in the through-hole 21a and includes two second joining materials 52 separated in the X direction on the top surface 22a. Also in the present modification, materials of the first joining material 51 and the second joining material 52 are the same, and are, for example, solder. Also with such a configuration, the same effects as those of the above embodiment may be obtained. In addition, since the joining material 50 is separated, it is possible to further reduce the force acting on the optical fiber 30 from the joining material 50 based on, for example, a temperature change or the like. The number of separated portions of the joining material 50 is not limited to 2, and may be 3 or more.

Fourth Embodiment

Figure 10:
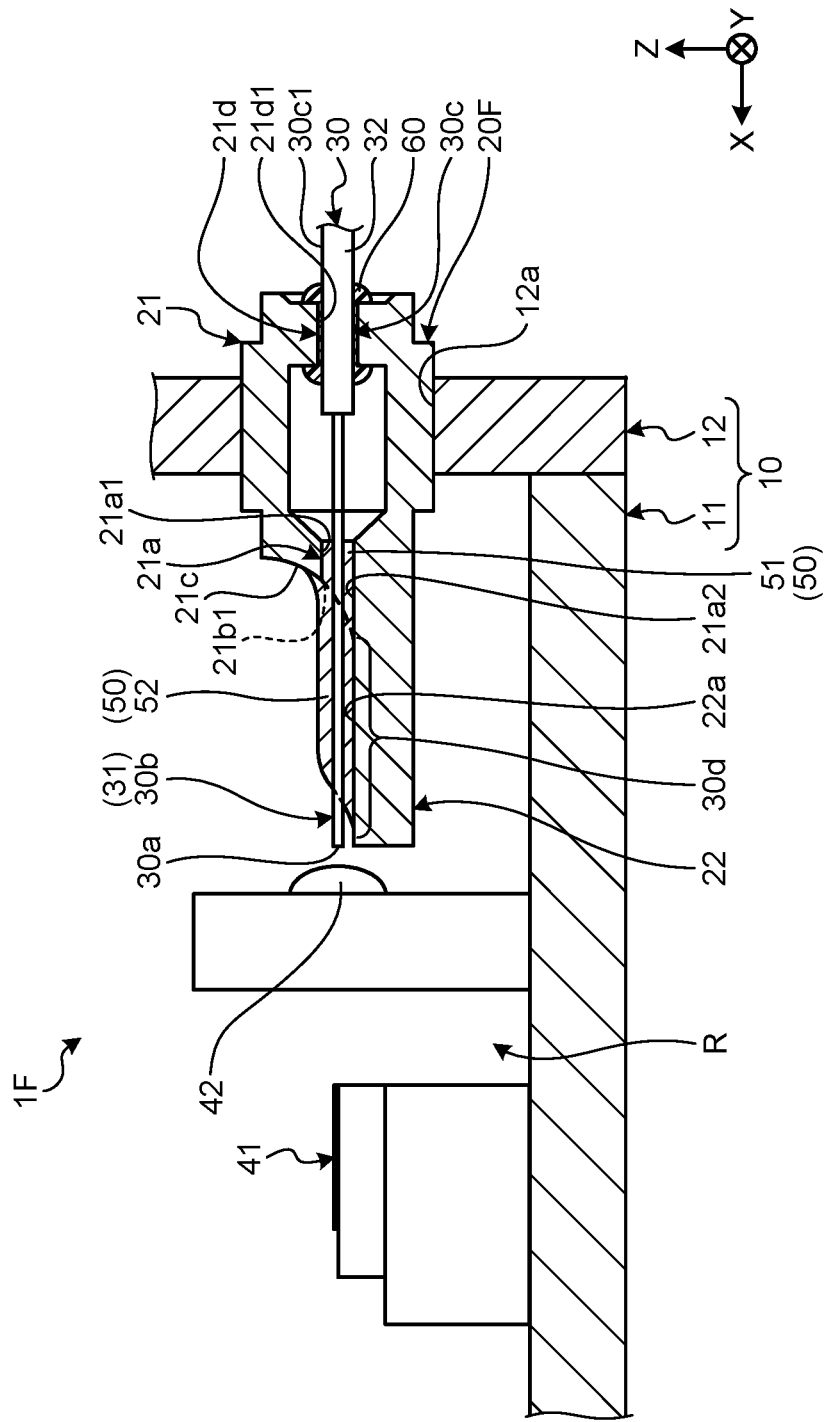
FIG. 10 is an exemplary schematic cross-sectional view (partial side view) of an optical device of a fourth embodiment.

FIG. 10 is a cross-sectional view (partial side view) of an optical device 1F according to a fourth embodiment in a cross section orthogonal to the Y direction. As illustrated in FIG. 10, in a sleeve 20F of the present embodiment, a semi-cylindrical portion 22 is located in a case 10.

The cylindrical portion 21 is provided with a through-hole 21d different from a through-hole 21a, and a joining material 60 different from the joining material 50 is interposed in a gap between an inner peripheral surface 21d1 of the through-hole 21d and an outer peripheral surface 30c1 of a covered portion 30c of an optical fiber 30. The material of the joining material 60 is different from the joining material 50, and is, for example, an adhesive. The joining material 60 joins the sleeve 20F and the optical fiber 30. In the present embodiment, the covered portion 30c of the optical fiber 30 penetrates the through-hole 21d, but the present disclosure is not limited thereto, and the exposed portion 30b may penetrate the through-hole 21d, or a boundary portion between the exposed portion 30b and the covered portion 30c may be accommodated in the through-hole 21d.

As described above, in the present embodiment, the semi-cylindrical portion 22 (support portion) is provided in the case 10.

According to such a configuration, for example, the joining portion between the sleeve 20F and the optical fiber 30 by the joining material 50 may be accommodated in the case 10 and protected by the case 10.

In the present embodiment, the joining material 60 is a joining material made of a material different from the joining material 50.

According to such a configuration, for example, by using the cheaper joining material 60, the optical device 1F may be improved in sealing performance and joining strength with a cheaper configuration.

Third Modification

Figure 11:
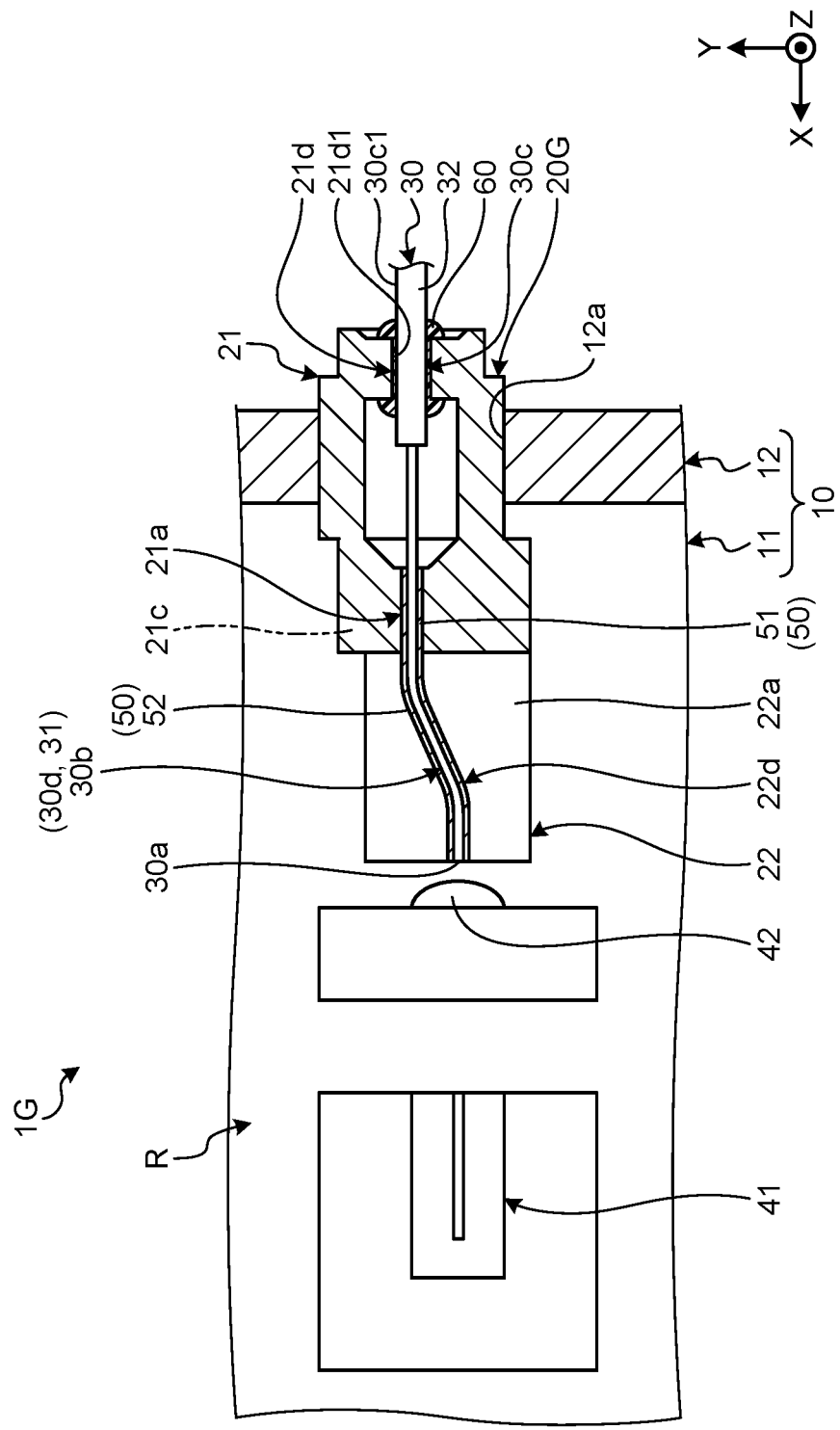
FIG. 11 is an exemplary schematic cross-sectional view (partial plan view) of an optical device of a third modification.

FIG. 11 is a cross-sectional view (partial plan view) of an optical device 1G of a third modification as a modification of the fourth embodiment in a cross section orthogonal to the Z direction. As illustrated in FIG. 11, in the present modification, a groove 22d continuous with a through-hole 21a is provided on a top surface 22a of a semi-cylindrical portion 22 of a sleeve 20G. The groove 22d accommodates a portion of an exposed portion 30b inside the case 10 with respect to the through-hole 21a. The groove 22d is curved in an S shape along a top surface 22a. The exposed portion 30b is curved along the groove 22d, and thus, the portion of the exposed portion 30b in the through-hole 21a and the end portion 30a are offset in the Y direction. In this manner, the optical fiber 30 is bent along the curved groove 22d.

In the present modification, the groove 22d is curved, and the exposed portion 30b (outer portion 30d) of the optical fiber 30 is curved along the groove 22d.

According to such a configuration, for example, the cabling route of the optical fiber 30 may be determined by the curved shape of the groove 22d of the sleeve 20G.

Fourth Modification

Figure 12:
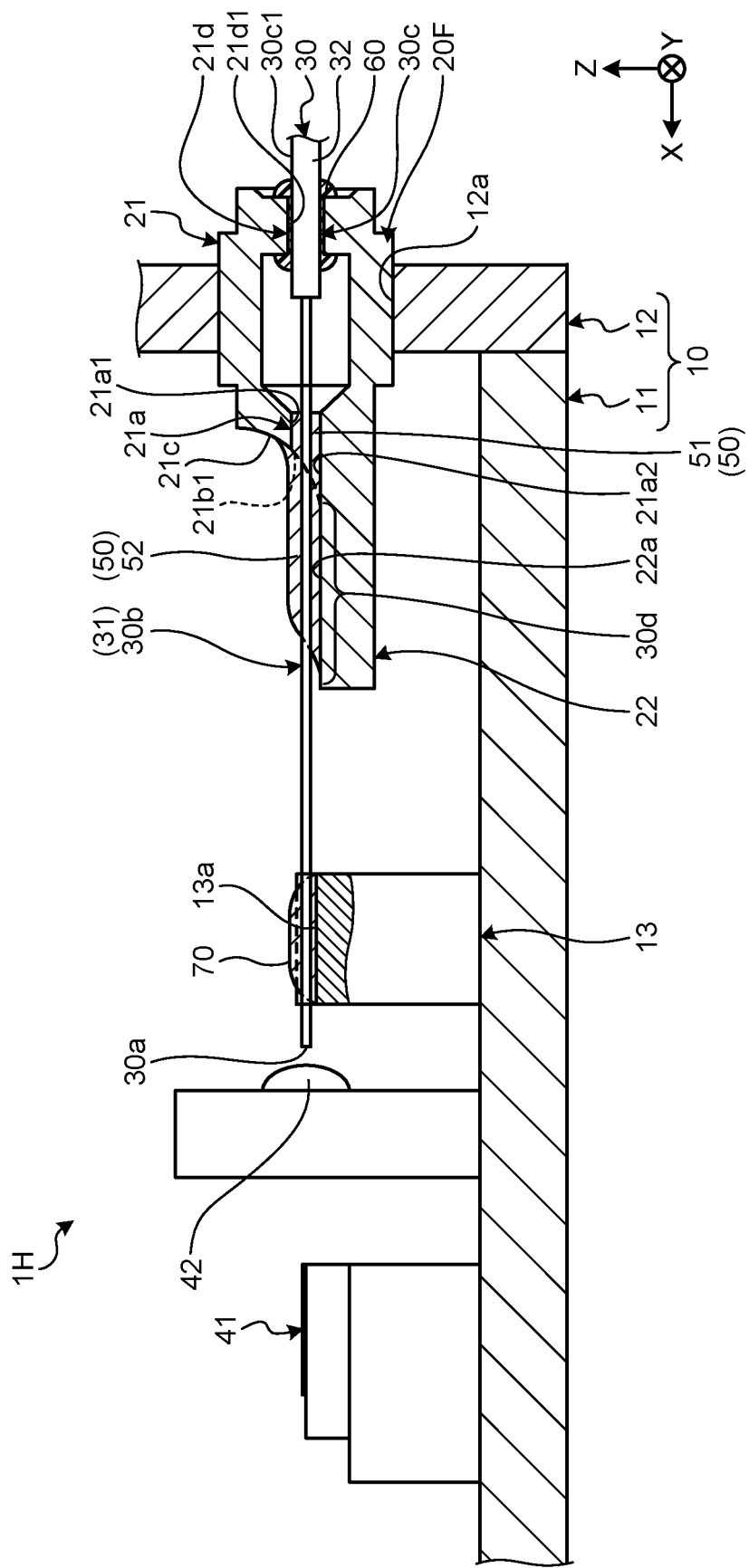
FIG. 12 is an exemplary schematic cross-sectional view (partial side view) of an optical device of a fourth modification.

FIG. 12 is a cross-sectional view (partial side view) of an optical device 1H of a fourth modification as another modification of the fourth embodiment in a cross section orthogonal to the Y direction. As illustrated in FIG. 11, in the present modification, the optical device 1H includes a support member 13. The support member 13 is attached to a bottom wall 11 in a state of protruding above the bottom wall 11. The support member 13 supports an exposed portion 30b and a portion of the optical fiber 30 between a portion supported by the sleeve 20F and an end portion 30a. That is, the support member 13 supports a position of the exposed portion 30b separated from the sleeve 20F. In the present embodiment, the support member 13 supports a portion of the exposed portion 30b close to the end portion 30a. The support member 13 may support the end portion 30a.

The support member 13 is provided with a groove 13a. The exposed portion 30b is accommodated in the groove 13a. In a state where the exposed portion 30b accommodated in the groove 13a, the exposed portion 30b and the support member 13 are joined to each other by a joining material 70. The material of the joining material 70 may be the same as the joining material 50 or the same as the joining material 60. In the present modification, the support member 13 supports a position away from the end portion 30a of the exposed portion 30b, but the present disclosure is not limited thereto. For example, the support member 13 may support the end portion 30a, may support the covered portion 30c, or may support a boundary portion between the exposed portion 30b and the covered portion 30c.

As described above, in the present embodiment, the support member 13 is accommodated in the case 10 and supports the optical fiber 30 at a position separated from the sleeve 20F.

According to such a configuration, for example, the optical fiber 30 may be more stably supported in the case 10. In addition, this makes it difficult for the end portion 30a of the optical fiber 30 to vibrate, and an advantage that optical coupling between the optical fiber 30 and an optical device such as the light source unit 41 is further stabilized, in other words, vibration resistance characteristics of the optical coupling are improved is also obtained. In addition, a relative arrangement of the sleeve 20F and the support member 13 also provides an advantage that the optical fiber 30 may be routed in a bent state between the sleeve 20F and the support member 13.

Fifth Embodiment

Figure 13:
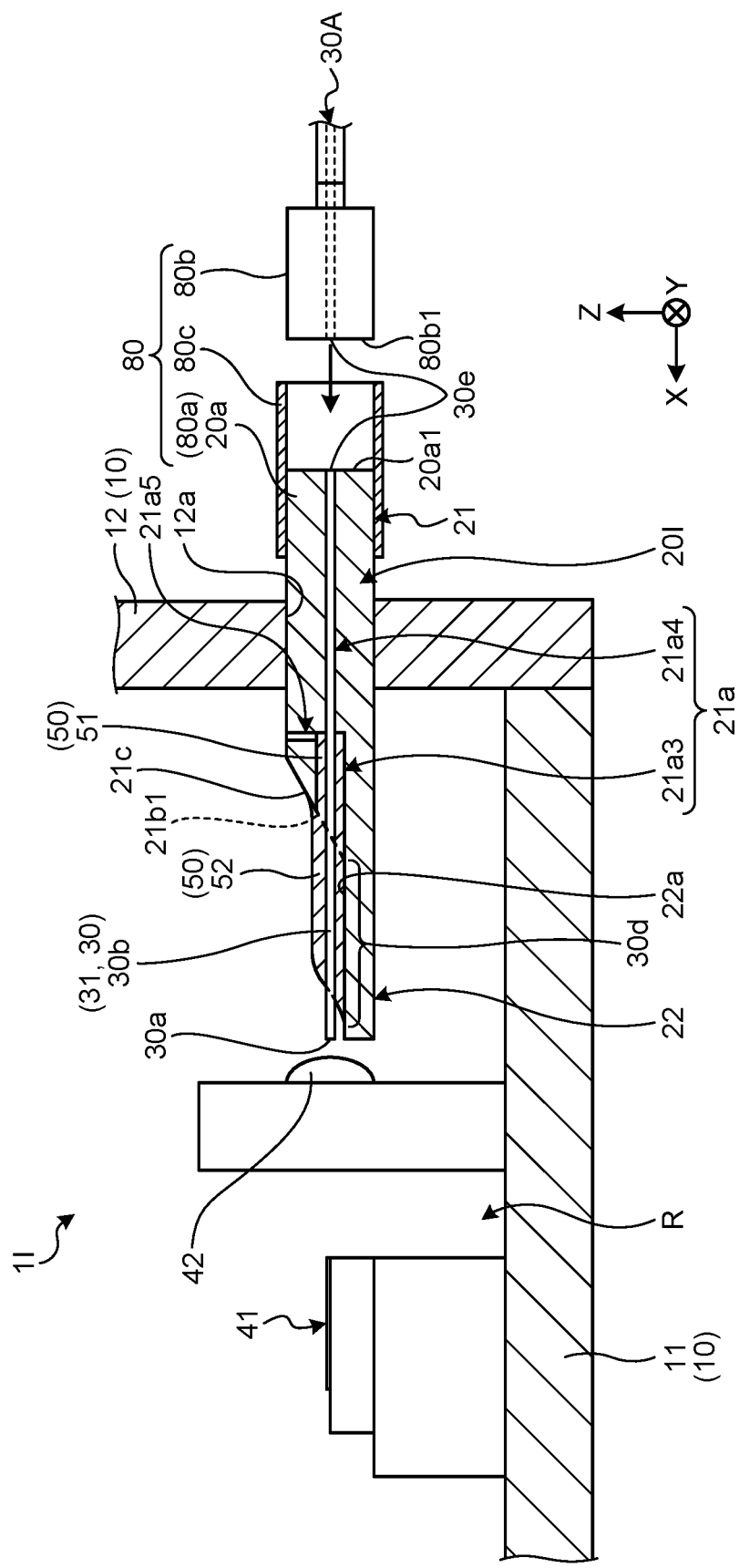
FIG. 13 is an exemplary schematic cross-sectional view (partial side view) of an optical device of a fifth embodiment.

FIG. 13 is a cross-sectional view (partial side view) of an optical device 1I according to a fifth embodiment in a cross section orthogonal to the Y direction. As illustrated in FIG. 13, in the present embodiment, a semi-cylindrical portion 22 is positioned in a case 10 as in the fourth embodiment and the modification thereof.

In the present modification, a through-hole 21a provided in a cylindrical portion 21 of a sleeve 20I has a first portion 21a3 and a second portion 21a4. The second portion 21a4 is located on a side opposite to an end portion 30a of an optical fiber 30 with respect to the first portion 21a3.

The first portion 21a3 accommodates an exposed portion 30b with a gap. A joining material 50 (first joining material 51) is interposed between an inner peripheral surface 21a1 of the first portion 21a3 and an outer peripheral surface 31a of the exposed portion 30b, and joins the sleeve 201 and the optical fiber 30 to each other. The first portion 21a3 is open to an end surface 21c inclined with respect to the X direction. A boundary portion between the first portion 21a3 and the second portion 21a4 is connected to the outside of the sleeve 201 (in the case 10) via an air vent hole 21a5.

An inner diameter of the second portion 21a4 substantially coincides with an outer diameter of the exposed portion 30b. That is, an end portion 20a of the sleeve 201 in the direction opposite to the X direction functions as a first ferrule 80a of a connector 80 that connects the optical fiber 30 and an optical fiber 30A to each other. The first ferrule 80a is an example of a connector portion.

The connector 80 includes a second ferrule 80b provided at an end portion of the optical fiber 30A and a connector sleeve 80c in addition to the first ferrule 80a. The first ferrule 80a and the second ferrule 80b have, for example, cylindrical shapes having the same outer diameter. An inner diameter of the cylindrical connector sleeve 80c is slightly larger than outer diameters of the first ferrule 80a and the second ferrule 80b.

An end surface 20a1 of the first ferrule 80a has a circular and planar end surface 20a1 orthogonal to the X direction. An end surface 30e of the optical fiber 30 is exposed at the center of the end surface 20a1.

An end surface 80b1 of the second ferrule 80b has a circular shape and a planar shape orthogonal to the X direction. The end surface 30e of the optical fiber 30A is exposed at the center of the end surface 80b1.

The connector 80 is configured such that the first ferrule 80a and the second ferrule 80b are accommodated in a state where the end surface 20a1 and the end surface 80b1 are butted with each other in the connector sleeve 80c. In a state where the end surface 20a1 and the end surface 80b1 are butted against each other, the end surface 30e of the optical fiber 30 and the end surface 30e of the optical fiber 30A are in contact with each other, and thus, the optical fiber 30 and the optical fiber 30A are optically coupled to each other.

As described above, in the present embodiment, the sleeve 201 includes the first ferrule 80a (connector portion). The first ferrule 80a constitutes the connector 80 that connects the optical fiber 30A (second optical fiber) different from the optical fiber 30 and the optical fiber 30.

According to such a configuration, for example, by integrating the sleeve 201 and the first ferrule 80a of the connector 80, it is possible to obtain advantages that the device configuration is further simplified and the number of components may be further reduced as compared with a configuration in which these are separate components.

Sixth Embodiment

Figure 14:
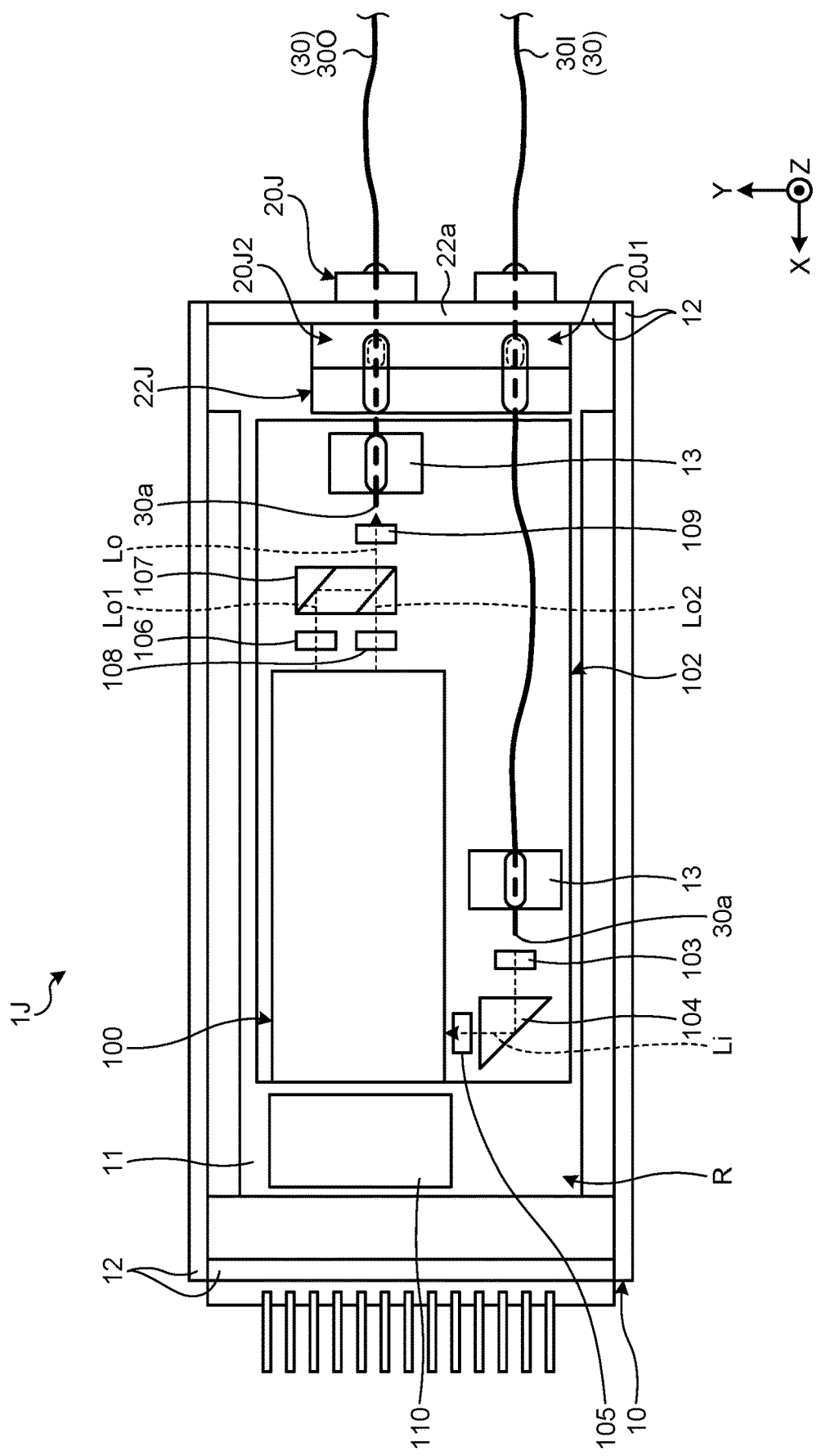
FIG. 14 is an exemplary and schematic plan view of the inside of an optical device of a sixth embodiment.
Figure 15:
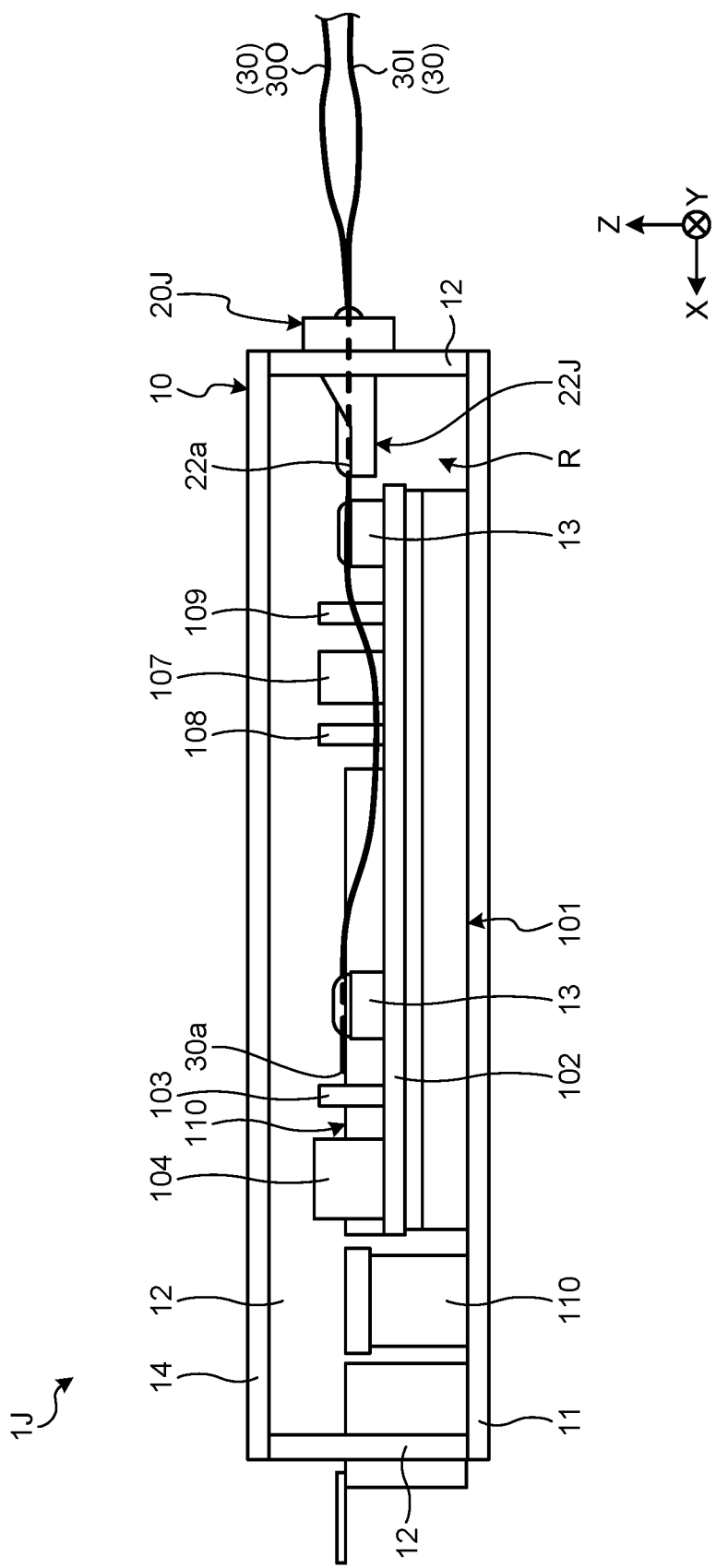
FIG. 15 is an exemplary schematic side view of the inside of the optical device of the sixth embodiment.

FIG. 14 is a plan view of an inside (an inside of a case 10) of an optical device 1J of a sixth embodiment as viewed in a direction opposite to the Z direction, and FIG. 15 is a side view of the inside of the optical device 1J as viewed in the Y direction. FIG. 14 illustrates a state in which a top wall 14 of the case 10 is removed, and FIG. 15 illustrates a state in which a part of a side wall 12 of the case 10 is removed.

The optical device 1J includes a modulator 100, an optical fiber 301, and an optical fiber 300. The modulator 100 receives light output from the optical fiber 301 and outputs light input to the optical fiber 300. The modulator 100 is an example of an optical device, and the optical fibers 301 and 300 are examples of first optical fibers.

As illustrated in FIG. 15, in the case 10, a substrate 102 is attached onto a bottom wall 11 of the case 10 via a thermo module 101. As illustrated in FIGS. 14 and 15, in addition to the two support members 13 and the modulator 100, a lens 103, a prism 104, a lens 105, a lens 106, a polarization combining unit 107, a lens 108, and a lens 109 are attached on the substrate 102. The lens 103, the prism 104, the lens 105, the lens 106, the polarization combining unit 107, the lens 108, and the lens 109 may also be referred to as optical components.

The optical fibers 301 and 300 pass through the sleeve 20J attached to the side wall 12 of the case 10. End portions 30a of the optical fibers 301 and 300 are positioned in the case 10.

As illustrated in FIG. 14, light (input light Li) emitted from the optical fiber 301 is input to the modulator 100 via the lens 103, the prism 104, and the lens 105.

The modulator 100 is, for example, a Mach-Zehnder (MZ) type phase modulator using indium phosphide (InP) as a constituent material, and is a known optical device that is driven by a modulator driver 110 and functions as an IQ modulator. The modulator 100 may have, for example, a configuration similar to that disclosed in WO 2016/021163.

The modulator 100 modulates the input light Li and outputs modulated light Lo1 and Lo2 of which polarization surfaces are orthogonal to each other. Both of the modulated light Lo1 and Lo2 are linearly polarized light and are IQ modulated. The modulator driver 110 that operates the modulator 100 includes, for example, an IC. An operation of the modulator driver 110 is controlled by a controller (not illustrated).

The lens 106 collimates the modulated light Lo1 and inputs the modulated light Lo1 to the polarization combining unit 107. Further, the lens 108 collimates the modulated light Lo2 and inputs the modulated light Lo2 to the polarization combining unit 107. The polarization combining unit 107 polarization-combines the modulated lights Lo1 and Lo2, and outputs output signal light Lo including the modulated lights Lo1 and Lo2. The output signal light Lo output from the polarization combining unit 107 is input to the end portion 30a of the optical fiber 300 via the lens 109.

The sleeve 20J includes a first sleeve portion 20J1 through which the optical fiber 301 passes and a second sleeve portion 20J2 through which the optical fiber 300 passes. The first sleeve portion 20J1 and the second sleeve portion 20J2 have the same configuration as the sleeve 20F of the fourth embodiment. However, the sleeve 20F includes a rectangular parallelepiped support portion 22J having a top surface 22a instead of the semi-cylindrical portion 22.

In the present embodiment, the optical device 1J includes the sleeve 20J in which the first sleeve portion 20J1 and the second sleeve portion 20J2 are integrated, but the present disclosure is not limited thereto, and the optical device 1J may separately include a sleeve supporting the optical fiber 301 and a sleeve supporting the optical fiber 300. In addition, the first sleeve portion 20J1 and the second sleeve portion 20J2 may have configurations similar to those of the sleeves 20A to 20E and 20G to 201 of another embodiment or modification different from the sleeve 20F, or may have other configurations equivalent or similar thereto.

In addition, each of the optical fibers 301 and 300 is supported by the support member 13 separated from the sleeve 20J. The support member 13 is attached to the bottom wall 11 of the case 10 via the thermo module 101 and the substrate 102.

Even in such an optical device 1J including the modulator 100, the same effects as those of the optical devices 1A and 1F to 1I including the sleeves 20A to 20I may be obtained.

Fifth Modification

Figure 16:
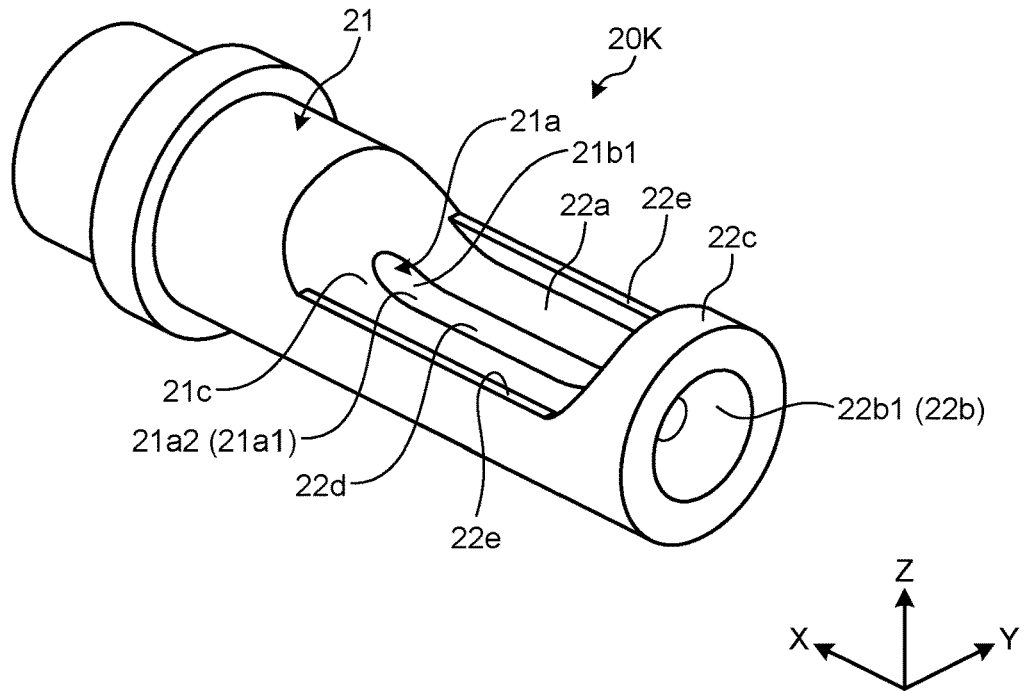
FIG. 16 is an exemplary schematic perspective view of a sleeve of a fifth modification.

FIG. 16 is a perspective view of a sleeve 20K of a fifth modification. As illustrated in FIG. 16, the sleeve 20K has wall portions 22e at both end portions of a top surface 22a in the Y direction. The wall portion 22e protrudes in the Z direction from the top surface 22a and extends in the X direction at a substantially constant height in the Z direction. According to such a configuration, the wall portion 22e may prevent solder (joining material 50) placed on the top surface 22a in a flowable state from flowing out of the top surface 22a. The sleeve 20K of the present modification may be applied to the optical devices 1A and 1F to 1J of other embodiments and modifications.

Sixth Modification

Figure 17:
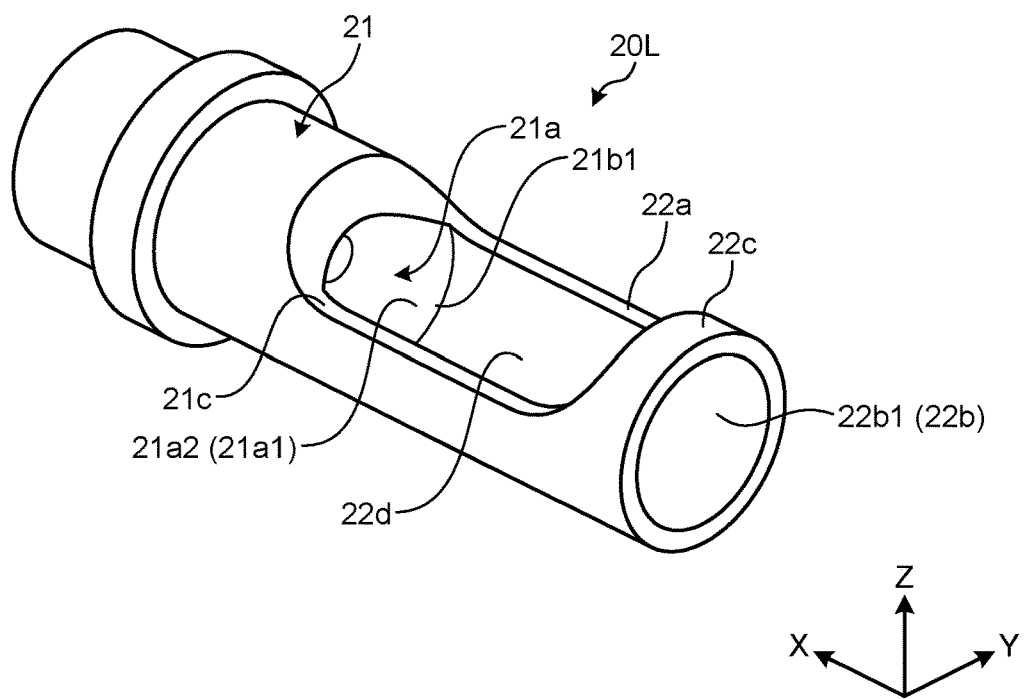
FIG. 17 is an exemplary schematic perspective view of a sleeve of a sixth modification.

FIG. 17 is a perspective view of a sleeve 20L of a sixth modification. As illustrated in FIG. 17, the sleeve 20L has a groove 22d wider and deeper than a through-hole 21a. An inner peripheral surface of the groove 22d has a cylindrical surface shape (cylindrical inner surface shape), and a diameter of the inner peripheral surface is equal to or larger than a diameter of an inner peripheral surface 21a1 of the through-hole 21a. According to such a configuration, for example, the flowing solder (joining material 50) flowing in from an opening portion in a top surface 22a of the groove 22d easily wraps around to an opposite side of a core wire 31 with respect to the opening portion, and a stronger joining state between the sleeve 20L and the optical fiber 30 is easily obtained. In the present modification, the inner peripheral surface of the groove 22d and the inner peripheral surface 22b1 of the through-hole 22b are smoothly connected without a step. Therefore, the groove 22d and the through-hole 22b may be formed in one step, and for example, it is possible to obtain an advantage that labor and cost for manufacturing the sleeve 20L may be further reduced. The sleeve 20L of the present modification may be applied to the optical devices 1A and 1F to 1J of other embodiments and modifications.

Seventh Modification

Figure 18:
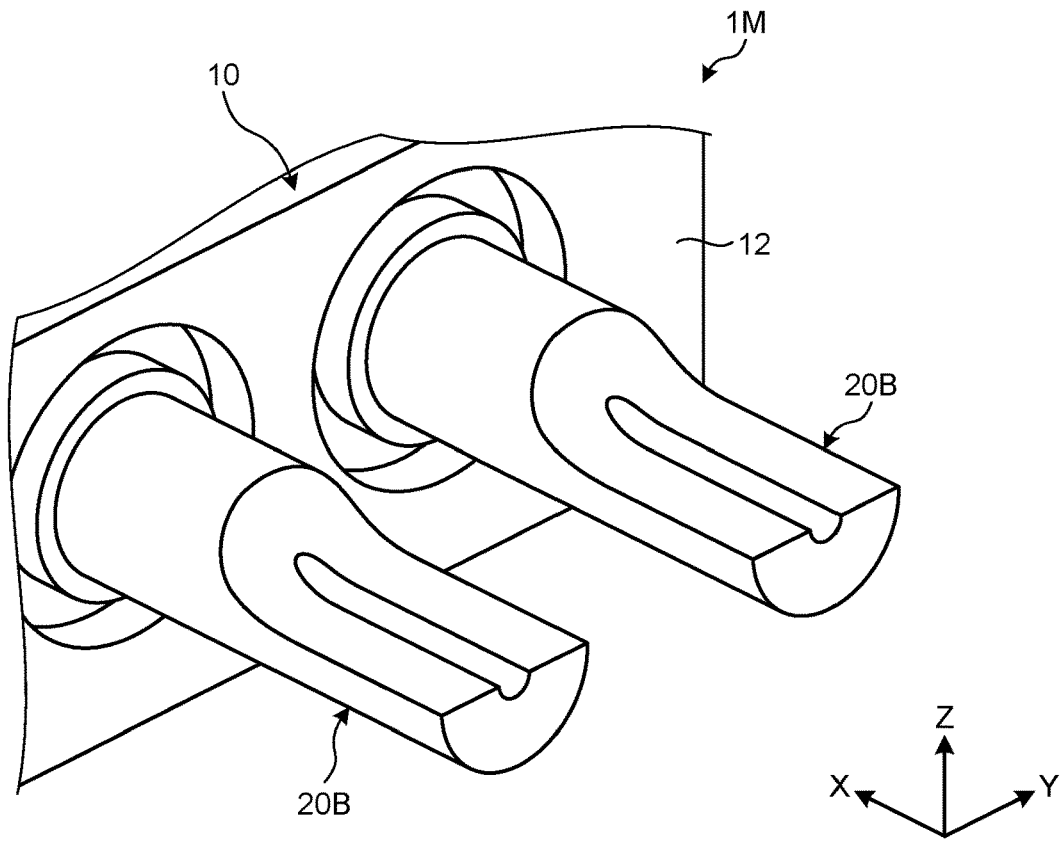
FIG. 18 is an exemplary schematic perspective view of an optical device of a seventh modification.

FIG. 18 is a perspective view of an optical device 1M of a seventh modification. As illustrated in FIG. 18, a case 10 may be provided with a plurality of (two) sleeves 20B. The number of the sleeves 20B may be 3 or more. In addition, instead of the sleeve 20B, sleeves 20A and 20C to 20L of other embodiments and modifications may be provided, or sleeves 20A to 20L different from each other may be provided.

Eighth Modification

Figure 19:
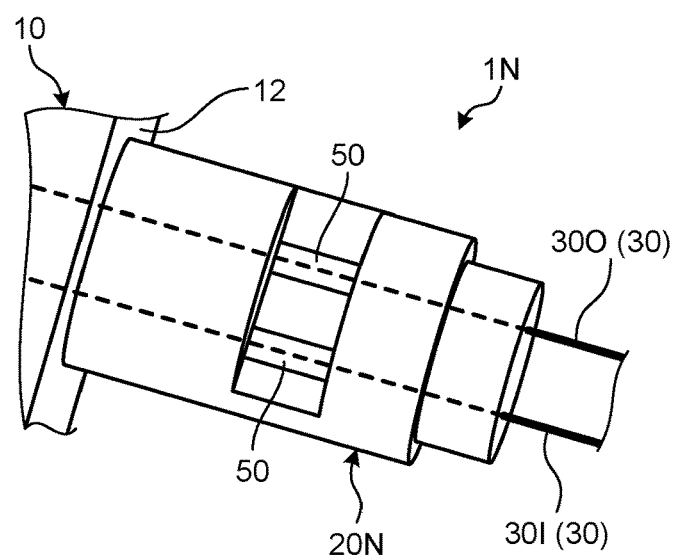
FIG. 19 is an exemplary schematic perspective view of an optical device of an eighth modification.

FIG. 19 is a perspective view of an optical device 1N according to an eighth modification. A plurality of optical fibers 30 (301, 300) may penetrate one sleeve 20N in a form as illustrated in FIG. 19. According to the configuration of the present modification, a step of placing the solder (joining material 50) having fluidity on the sleeve 20N may be executed outside the case 10. In addition, since the plurality of optical fibers 30 pass through one sleeve 20N, it is possible to obtain an advantage that the joining process between each of the optical fibers 30 and the sleeve 20N may be executed more quickly at a relatively close place. In FIG. 19, joining materials 50 that join the optical fiber 30 and the sleeve 20N are separated from each other, but the present disclosure is not limited thereto. For example, the joining materials 50 that join the plurality of optical fibers 30 and the sleeve 20N may be integrated with each other by placing a solder (joining material 50) having fluidity between the two optical fibers 30 and using spreading of the solder. In this case, a configuration in which a plurality of optical fibers 30 and one sleeve 20N are joined by one joining material 50 is obtained. The sleeve 20N of the present modification may be applied to the optical devices 1A, 1F to 1J, and 1M of other embodiments and modifications.

Although the embodiment and the modification have been exemplified above, the embodiment and the modification are merely examples, and are not intended to limit the scope of the disclosure. The above-described embodiments and modifications may be implemented in various other forms, and various omissions, substitutions, combinations, and changes may be made without departing from the gist of the disclosure. In addition, specifications (structure, type, direction, model, size, length, width, thickness, height, number, arrangement, position, material, and the like) of each configuration, shape, and the like may be appropriately changed and implemented.

For example, the joining material is not limited to the solder.

The present disclosure is also applicable to a case where an ultrasonic soldering apparatus is not used.

Further, the sleeve does not need to be a member separate from the case, and may be formed by processing a part of the case.

According to the present disclosure, in the sleeve, since the first through-hole opens to the inclined surface inclined with respect to the penetrating direction of the first through-hole, an opening area of the first through-hole may further increase. Therefore, the joining material having fluidity more easily enters the first through-hole from the opening provided in the inclined surface.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for manufacturing an optical device including: a case;
a sleeve attached to the case, the sleeve including:
a cylindrical portion including a first through-hole penetrating between an inside and an outside of the case, and
a semi-cylindrical portion that is a support portion and protrudes from the cylindrical portion;
a first optical fiber including:
a core wire including a core and a clad, and
a sheath configured to surround the core wire, wherein an exposed portion of the core wire not surrounded by the sheath passes through the first through-hole; and
a joining material,
wherein the cylindrical portion includes an inclined surface inclined with respect to a penetrating direction of the first through-hole and having an opening of the first through hole,
the semi-cylindrical portion includes a flat top surface along the penetrating direction of the first through-hole, and the inclined surface and the top surface are smoothly connected to each other by a concave curved surface without a step,
the joining material includes a first joining material and a second joining material that are integrated with each other, the first joining material directly surrounds an outer peripheral surface of the exposed portion without any material or coating of the exposed portion between the first joining material and the outer peripheral surface of the exposed portion, is disposed within the first through-hole interposed in a gap between the outer peripheral surface of the exposed portion and an inner peripheral surface of the first through-hole, and seals the gap, the second joining material is disposed on the top surface and configured to join the outer peripheral surface of the exposed portion and the top surface in a state of directly surrounding the outer peripheral surface of the exposed portion without any material or coating of the exposed portion between the first joining material and the outer peripheral surface of the exposed portion, the joining material as a whole is configured to join the sleeve and the first optical fiber, and the semi-cylindrical portion is configured to support the exposed portion on the top surface via the second joining material, the method comprising:

causing the first joining material in a flowing state to enter between the outer peripheral surface of the exposed portion and the inner peripheral surface of the first through-hole, and causing the second joining material in a flowing state to enter between the outer peripheral surface and the top surface; and solidifying the first joining material, wherein the first joining material and the second joining material which are integrated with each other consist of a continuous volume of joining material of the same material composition, and the joining material enters from the concave curved portion where the inclined surface and the top surface are smoothly connected to each other without a step.

2. An optical device manufactured by the method according to claim 1, the optical device comprising:
a case;
a sleeve attached to the case, the sleeve including:
a cylindrical portion including a first through-hole penetrating between an inside and an outside of the case, and
a semi-cylindrical portion that is a support portion and protrudes from the cylindrical portion;
a first optical fiber including:
a core wire including a core and a clad, and
a sheath configured to surround the core wire, wherein an exposed portion of the core wire not surrounded by the sheath passes through the first through-hole; and
a joining material
wherein the cylindrical portion includes an inclined surface inclined with respect to a penetrating direction of the first through-hole and having an opening of the first through hole,
the semi-cylindrical portion includes a flat top surface along the penetrating direction of the first through-hole, and the inclined surface and the top surface are smoothly connected to each other by a concave curved surface without a step,
the joining material includes a first joining material and a second joining material that are made of the same material and integrated with each other,
the first joining material directly surrounds an outer peripheral surface of the exposed portion without any material or coating of the exposed portion between the first joining material and the outer peripheral surface of the exposed portion, is disposed within the first through-hole interposed in a gap between the outer peripheral surface of the exposed portion and an inner peripheral surface of the first through-hole, and seals the gap, the second joining material is disposed on the top surface and configured to join the outer peripheral surface of the exposed portion and the top surface in a state of directly surrounding the outer peripheral surface of the exposed portion without any material or coating of the exposed portion between the first joining material and the outer peripheral surface of the exposed portion, the joining material as a whole is configured to join the sleeve and the first optical fiber, and the semi-cylindrical portion is configured to support the exposed portion on the top surface via the second joining material.

3. The optical device according to claim 2, wherein the support portion includes a groove configured to accommodate at least a part of the first optical fiber.

4. The optical device according to claim 3, wherein the groove is curved, and the first optical fiber is bent along the groove.

5. The optical device according to claim 2, wherein the support portion includes a second through-hole through which the first optical fiber passes.

6. The optical device according to claim 2, wherein the inclined surface extends to a side opposite to the support portion with respect to the opening of the first through-hole.

7. The optical device according to claim 2, wherein the support portion is provided in the case.

8. The optical device according to claim 2, wherein the support portion is provided outside the case.

9. The optical device according to claim 2, wherein the sleeve includes a connector configured to connect a second optical fiber and the first optical fiber to each other.

10. The optical device according to claim 2, further comprising a support member accommodated in the case and configured to support the first optical fiber at a position separated from the sleeve.

11. The optical device according to claim 2, wherein the first joining material and the second joining material are solder.

12. The optical device according to claim 2, further comprising an optical device accommodated in the case and configured to output light input to the first optical fiber and receive light output from the first optical fiber.

13. The optical device according to claim 2, wherein
the first optical fiber includes a plurality of optical fibers,
the integrated first and the second joining materials that join one of the plurality of optical fibers and the sleeve are separated from the integrated first and the second joining materials that join another one of the plurality of optical fibers and the sleeve.

14. The optical device according to claim 2, wherein the continuous volume of joining material of the same material composition bridges from the first through-hole to the sheath of the optical fiber.

15. The method for manufacturing an optical device according to claim 1, wherein
the joining material is solder, and
the causing uses an ultrasonic soldering device.

16. The method for manufacturing an optical device according to claim 15, wherein the causing includes transmitting ultrasonic vibration from the ultrasonic soldering device to the sleeve.

17. The method for manufacturing an optical device according to claim 1, wherein the continuous volume of joining material of the same material composition bridges from the first through-hole to the sheath of the optical fiber.

* * * * *